(12) United States Patent
Justin et al.

(10) Patent No.: US 9,887,984 B2
(45) Date of Patent: Feb. 6, 2018

(54) AUTONOMOUS SYSTEM FOR SECURE ELECTRIC SYSTEM ACCESS

(71) Applicant: Temporal Defense Systems, LLC, Renton, WA (US)

(72) Inventors: Ronald Lance Justin, Santa Barbara, CA (US); Charles Elden, Dunnellon, FL (US); Jared Karro, Charlotte, NC (US); Mark Tucker, Kirkland, WA (US)

(73) Assignee: TEMPORAL DEFENSE SYSTEMS, LLC, Renton, WA (US)

( * ) Notice: Subject to any disclaimer, the term of this patent is extended or adjusted under 35 U.S.C. 154(b) by 84 days.

(21) Appl. No.: 14/938,683

(22) Filed: Nov. 11, 2015

(65) Prior Publication Data

US 2016/0149900 A1   May 26, 2016

Related U.S. Application Data

(60) Provisional application No. 62/078,137, filed on Nov. 11, 2014.

(51) Int. Cl.
*H04L 29/00* (2006.01)
*H04L 29/06* (2006.01)
(Continued)

(52) U.S. Cl.
CPC .......... *H04L 63/0823* (2013.01); *G06F 21/33* (2013.01); *G06F 21/577* (2013.01);
(Continued)

(58) Field of Classification Search
CPC .... G06F 21/31; G06F 17/30241; G06F 21/44; G06F 21/6227; G06F 2221/2117;
(Continued)

(56) References Cited

U.S. PATENT DOCUMENTS 6,615,182 B1   9/2003   Powers et al.
7,735,116 B1   6/2010   Gauvin
(Continued)

OTHER PUBLICATIONS

U.S. Appl. No. 14/523,577, Publication No. 2016-0116893 A1, filed Oct. 24, 2014, Pending.
(Continued)

*Primary Examiner* — Ghazal Shehni
(74) *Attorney, Agent, or Firm* — DLA Piper LLP US

(57) ABSTRACT

Secure electronic access may be provided by receiving at least one electronic certificate from an electronic device seeking to access a secure resource at a device under protection including at least one security processor, the at least one certificate providing device information related to the security of the electronic device, and comparing with at least one autonomous processor of an autonomous system the device information to the security requirement information. The at least one autonomous processor may instruct the at least one security processor to provide the secure resource to the device when the device information meets the security requirement information. The device under protection may provide the secure resource to the electronic device in response to the instruction.

34 Claims, 37 Drawing Sheets

(51) Int. Cl.
*G06F 21/62* (2013.01)
*G06F 21/86* (2013.01)
*G06F 21/33* (2013.01)
*H04L 9/32* (2006.01)
*G06F 21/57* (2013.01)

(52) U.S. Cl.
CPC .......... *G06F 21/6218* (2013.01); *G06F 21/86* (2013.01); *H04L 9/3247* (2013.01)

(58) Field of Classification Search
CPC ..... G06F 8/65; G06F 21/6218; H04L 9/3247; H04L 63/101; H04L 67/02
See application file for complete search history.

(56) References Cited

U.S. PATENT DOCUMENTS

| | | | |
|---|---|---|---|
| 8,516,597 | B1 | 8/2013 | Sharma |
| 8,635,662 | B2 | 1/2014 | Lang |
| 8,667,589 | B1 | 3/2014 | Saprygin et al. |
| 8,819,769 | B1 | 8/2014 | Van Dijk |
| 9,294,498 | B1 | 3/2016 | Yampolskiy et al. |
| 2001/0039624 | A1 | 11/2001 | Kellum |
| 2002/0048369 | A1 | 4/2002 | Ginter et al. |
| 2004/0015724 | A1 | 1/2004 | Pham et al. |
| 2005/0102513 | A1 | 5/2005 | Alve |
| 2006/0064740 | A1 | 3/2006 | Kelley et al. |
| 2006/0117182 | A1* | 6/2006 | Wolff ....................... G06F 21/64 713/176 |
| 2006/0168202 | A1 | 7/2006 | Reshef et al. |
| 2006/0288420 | A1 | 12/2006 | Mantripragada et al. |
| 2007/0143629 | A1 | 7/2007 | Hardjono et al. |
| 2008/0077703 | A1 | 3/2008 | Lee |
| 2008/0155649 | A1 | 6/2008 | Maler et al. |
| 2009/0024663 | A1 | 1/2009 | McGovern |
| 2009/0199264 | A1 | 8/2009 | Lang |
| 2009/0228316 | A1 | 9/2009 | Foley et al. |
| 2011/0154498 | A1 | 6/2011 | Fissel et al. |
| 2011/0247081 | A1 | 10/2011 | Shelton |
| 2012/0185910 | A1 | 7/2012 | Miettinen et al. |
| 2013/0054018 | A1 | 2/2013 | Holman et al. |
| 2013/0097696 | A1* | 4/2013 | Baker ................. H04L 63/1441 726/17 |
| 2013/0145178 | A1 | 6/2013 | Jeffries et al. |
| 2013/0191898 | A1 | 7/2013 | Kraft |
| 2013/0291057 | A1 | 10/2013 | Slyfield |
| 2014/0222866 | A1 | 8/2014 | Joneja |
| 2014/0282895 | A1* | 9/2014 | Stuntebeck ............. G06F 21/34 726/4 |
| 2015/0264061 | A1 | 9/2015 | Ibatullin et al. |

OTHER PUBLICATIONS

U.S. Appl. No. 14/634,562, Publication No. 2015-0249677 A1, filed Feb. 27, 2015, Pending.
International Search Report issued in International Patent Application No. PCT/US2015/060216 dated Feb. 4, 2016.
Written Opinion of the International Searching Authority in International Patent Application No. PCT/US2015/060216 dated Feb. 4, 2016.
International Search Report issued in International Patent Application No. PCT/US2015/056496 dated Jan. 11, 2016.
Written Opinion of the International Searching Authority in International Patent Application No. PCT/US2015/056496 dated Jan. 11, 2016.
International Search Report issued in International Patent Application No. PCT/US2015/018141 dated Jun. 3, 2015.
Written Opinion of the International Searching Authority in International Patent Application No. PCT/US2015/018141 dated Jun. 3, 2015.
U.S. Appl. No. 14/523,577.
International Search Report dated Jan. 29, 2016 issued in International Application No. PCT/US2015/060212.
Written Opinion dated Jan. 29, 2016 issued in International Application No. PCT/US2015/060212.
U.S. Appl. No. 14/855,196.
U.S. Appl. No. 14/634,562.
Partial Image File Wrapper for U.S. Appl. No. 14/855,196.
Partial Image File Wrapper for U.S. Appl. No. 14/634,562.

* cited by examiner

Race Circuit

Bus

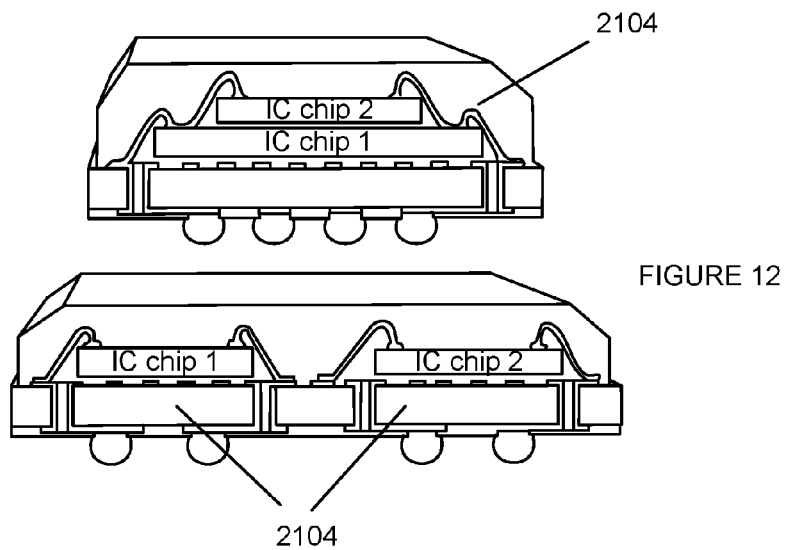
FIGURE 12
FIGURE 13
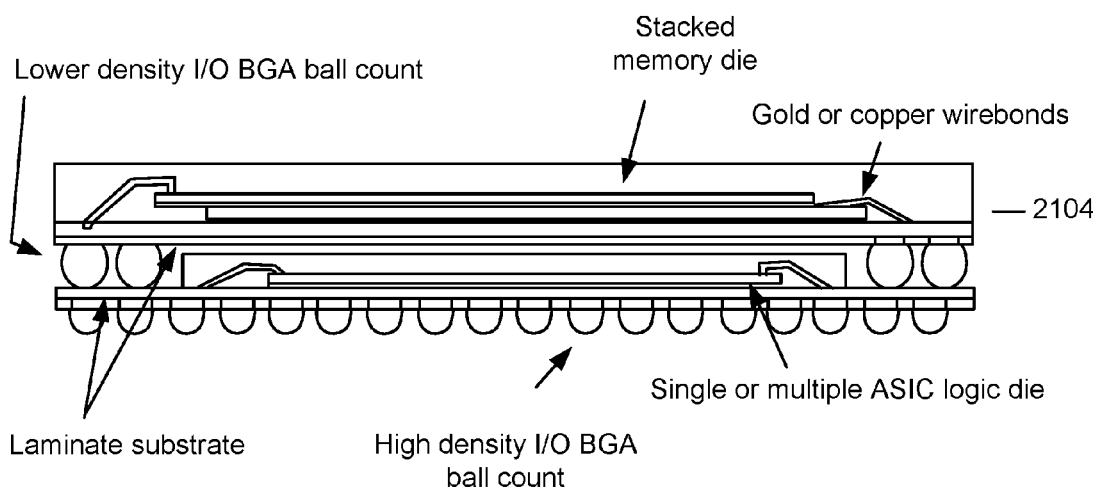

Base Security Score Certificate (BSSC)

Standard Certificate Fields:                  2700
Issued to
Serial Number
Issue Date
Expiration Date
...

Unique Certificate Fields:
Rate of Decay
Security Category #1
    Security Object Score #1
    Security Object Score #2
    ...
    Security Object Score #M Security Category #M
    Security Object Score #1
    Security Object Score #2
    ...
    Security Object Score #M

FIG. 24

AUTONOMOUS SYSTEM FOR SECURE ELECTRIC SYSTEM ACCESS

CROSS-REFERENCE TO RELATED APPLICATIONS

This disclosure claims priority from U.S. Provisional Application No. 62/078,137, entitled "Autonomous System for Secure Electronic System Access," filed Nov. 11, 2014, the entirety of which is incorporated by reference herein. This disclosure also incorporates U.S. patent application Ser. No. 14/523,577, filed Oct. 24, 2014, and U.S. patent application Ser. No. 14/634,562, filed Feb. 27, 2015, by reference in their entirety herein.

BRIEF DESCRIPTIONS OF THE DRAWINGS

FIG. 12 is an autonomous control system including a semiconductor multi-chip module according to an embodiment of the invention.

FIG. 13 is an autonomous control system mounted externally on an interposer PCB according to an embodiment of the invention.

FIG. 24 is a base security score certificate according to an embodiment of the invention.

DETAILED DESCRIPTIONS OF SEVERAL EMBODIMENTS

Figure 1:
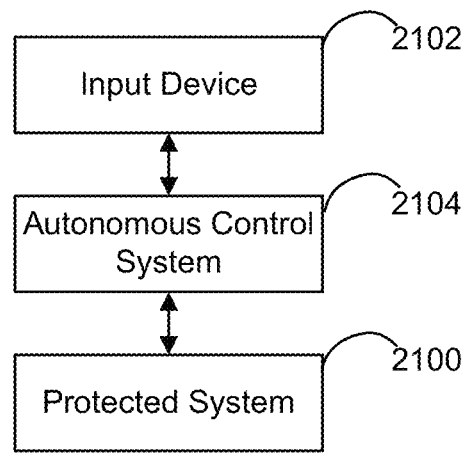
FIG. 1 is a protected system, autonomous control system, and input device according to an embodiment of the invention.

Electronic, mechanical, chemical, and biological systems may have states or sequences of states that can lead to catastrophic failure. Such fatal states can occur from internal natural forces, external accidental forces, or external intentionally hostile forces. In industrial systems, actuating devices or systems under remote control and monitoring may have known detrimental states that could be allowed by the control system as a result of malfunction, user error, or a malicious or hostile act. The actuating device may accept and execute such commands or out of bounds signals, causing the overall related system to suffer, degrade, or destruct from such an induced state. For example, an induced detrimental system state may be a process speed that is too fast or too slow, a valve that is opened too far or closed too tight, or a pressure or temperature that is too high or too low. Many devices may lack their own internal safeguards to physically or electronically prevent these out of bounds operations.

The systems and methods described herein may provide autonomous control that may monitor and modify or block input and/or output signals in accordance with business and/or security rules in order to protect system critical components. Signal modification and/or blocking may ensure that out of bounds connection states between and within devices or systems either do not occur or only occur for inconsequential amounts of time to minimize or prevent undesired system effects. (A connection state may be any monitored signal level or command between two or more devices or systems at a particular instant of time at the physical layer level. The physical layer may be the lowest hardware layer of a device or a system where raw signals are transferred, for example.) When signals that violate the rules are detected, an autonomous control system (e.g., a circuit)

may block the violating signals by internally switching them off. The circuit may instead send no signal or a failsafe signal to a protected system, which may be any device or system under protection (DUP) by the autonomous control system. The circuit may be configured for use with legacy systems, for example by being designed into a system upgrade or retrofitted to the system.

In some embodiments, the autonomous control may be based on a quantum security model (QSM). QSM is a security measurement and comparison methodology. QSM may provide a normalized methodology of breaking down a system and evaluating primitive components in a consistent manner, which may allow interdependencies to be more accurately understood and measured. QSM may provide a method to normalize the resultant evaluation of the primitive components to a quantifiable score. QSM may allow a resource owner to specify what evaluating (signing) authorities they recognize and accept. QSM methods may be used to evaluate both the current and probabilistic future security state of a system or device. QSM may allow individual resource owners to specify and verify an asset's security score prior to granting access. QSM may enable assets with computational ability to mutually authenticate each other prior to sharing resources or services.

In QSM, a common measurement may be reached through an evaluation process conducted on a device, system, or entity (the "asset") where an agreed upon, reproducible, independently verifiable security level determination is desired. A quantum security unit symbolized as ("qS") and pronounced ("qSec") may be a standard unit of measure for security of a system based on the QSM. A qSec may be a temporal value similar to the position of a particle in quantum physics such that it may only be estimated at best and best known at the moment a measurement is conducted by an observer. After measurement, the position of a particle may only be probabilistically determined with a degrading precision over time. A qSec, being a quantum measurement, may share this characteristic. It may be postulated that systems may be viewed as wave-like systems from the perspective of security and the principles of quantum mechanics can be applied. The security of a system is a property of that system. The passage of time, along with the normal functioning and operation of the system and its environment may all affect the security of a system. As a result, the security of a system may be dynamic and the known state of the security may be transient by nature. Therefore, systems may be represented as wave-like systems and system security as a quantum property. Similar to the position of a particle, the security of a system may be quantifiably defined using quantum mechanical principles for measurement. The measurement results may provide a security measure represented in quantum security units, where a value of zero represents the complete lack of any security in a system, and increasing values indicate higher security.

The value that one qSec represents may be derived from criteria to be evaluated during the system security measurement process. Each criterion may have a common value range related to their impact to security. Also, each criterion may have an associated evaluation process that produces a result within that range. A criteria weighting method may be applied to each criteria, and the common value range may become a security value scale for what a quantum security measurement represents as denoted in qSecs. For example, the qSec value may represent an eigenvalue in matrix mechanics. Different observers at different periods of time may theoretically interpret this value differently depending on their perspective and may desire to apply their own probabilistic filters to a qSec value or conduct their own measurement process to determine the qSec value of a system. Thus, the value may be predetermined in order to utilize qSec measurement in a meaningful way when classifying system security. The predetermination may be done automatically, may be set by a user, and/or may be set at or before system initialization.

Systems and methods described herein may comprise one or more computers, which may also be referred to as processors. A computer may be any programmable machine or machines capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. It will be understood by those of ordinary skill that those terms used herein are interchangeable, and any computer capable of performing the described functions may be used. Computers may be linked to one another via a network or networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, 4G, or other wireless connections). Connections between computers may use any protocols, including connection-oriented protocols such as TCP or connectionless protocols such as UDP. Any connection through which at least two computers may exchange data can be the basis of a network.

In some embodiments, the computers used in the described systems and methods may be special purpose computers configured specifically for autonomous security. For example, a server may be equipped with specialized processors, memory, communication components, etc. that are configured to work together to perform functions related to autonomously securing electronic systems as described in greater detail below.

Autonomous Control Systems and Methods

FIG. 1 illustrates a protected system 2100. The protected system 2100 may be in communication with an input device 2102. The input device 2102 may send signals to and/or receive signals from the protected system 2100. The input device may be, for example, an analog or digital signal port, a control knob, a touch display, a keyboard, a mouse, and/or some other peripheral device. The input device 2102 may also be a host device for the protected system 2100 or a device on a network. An autonomous control system 2104, which may be referred to as a dedicated monitoring and action device (DMAD), may be positioned serially between the input device 2102 and the protected system 2100 and/or in parallel with the input device 2102 and the protected system 2100. As described in greater detail below, various embodiments of the autonomous control system 2104 may comprise electronic circuits, processors and memory configured to execute software, or a combination thereof. An autonomous control system 2104 may be internally secure (e.g., including encryption and anti-tamper capabilities). Autonomous control system 2104 may also be manifested serially or in parallel to the data connections between input device/host 2102 and protected system 2100 in both directions of data flow, so that the autonomous control system 2104 may monitor input signals coming to protected system 2100 and output signals coming from protected system 2100.

In some embodiments, the autonomous control system 2104 may create a deterministic race condition to enforce rules. A deterministic race condition may be an intentionally induced race condition between an injected signal and an oncoming signal such that there is a high level of certainty that only the injected signal will affect the output. As rule violating signals emerge on the data bus to or from a protected system 2100, the autonomous control system 2104 may race to detect the violation and may either internally switch off the signal and substitute failsafe signals if serially interfaced or may attempt to modify the signal if parallel interfaced. Incoming and/or outgoing signals may be buffered to provide more detection time and guarantee that only validated signals are transmitted by the autonomous control system 2104 to the protected system 2100 or vice versa.

In some embodiments, the autonomous control system 2104 may be physically manifested in the protected system 2100 or physically connected to the protected system 2100 or a control device in a variety of ways such as silicon die on die, integrated circuit package on package, modularized system module on module, fiber-optic, radio-frequency, wire, printed circuit board traces, quantum entanglement, or molecular, thermal, atomic or chemical connection.

In some embodiments, the autonomous control system 2104 may include physical interfaces that connect serially, in parallel, or both in serial and parallel between one or more devices or systems (e.g., the input device 2102 and protected system 2100). Each physical connection type may have a different set of design considerations and tradeoffs for a given application and system type such as organic, electronic, or radio frequency. For example, in an electronic system, voltage interface levels, signal integrity, drive strength, anti-tamper, and/or induced propagation delays may be evaluated to determine the connection method.

In some embodiments, the autonomous control system 2104 may be a computer system with encrypted memory storage and anti-tamper features that may be designed, programmed, and positioned to autonomously enforce specific security and business rules on a host system or device. The autonomous control system 2104 may include components such as processing logic, memory storage, input/output buffers, communication ports, and/or a reprogramming port. The autonomous control system 2104 may constantly analyze connection states in real time between any number of devices or systems and may enforce pre-defined business and security rules. When out of bounds states are detected, the autonomous control system 2104 may block, override, or change the prohibited connection state to a known good state. Similar methods may be applied to electrical, optical, electro-mechanical, electromagnetic, thermal, biological, chemical, molecular, gravitational, atomic, or quantum mechanical systems, for example.

In some embodiments, the autonomous control system 2104 may include a programmable device that may be programmed to autonomously behave deterministically in response to stimuli. For example, the autonomous control system 2104 may include a field programmable gate array (FPGA), a microcontroller (MCU), microprocessor (MPU), software-defined radio, electro-optical device, quantum computing device, organic compound, programmable matter, or a programmable biological virus. The autonomous control system 2104 may be connected to the protected system 2100 directly or to one or more control devices acting on the protected system 2100. The autonomous control system 2104 may be connected physically, such as by silicon die on die, integrated circuit package on package, modularized system module on module, fiber-optic, radio-frequency, wire, printed circuit board traces, quantum entanglement, molecular, thermal, atomic, or chemical means.

In some embodiments, the autonomous control system 2104 may securely store data (such as cryptographic certificates or system logs) separate from the protected system 2100 memory so that it may only be accessed or modified with stronger authentication methods and access controls than the protected system 2100 provides. For example, the autonomous control system 2104 may be used by a computer system to implement a security scoring methodology (e.g., the autonomous control system 2104 may be used for storage of security certificates and requirement information). Furthermore, the security scoring method may leverage the autonomous control system 2104 for validation/verification, authentication, and authorization of outside resources based on security score information. The stored data may be used for verification of security integrity in combination with other systems, for example.

In some embodiments, the autonomous control system 2104 may be used to implement electronic cryptographic public-key infrastructure (PKI) inside of electronic systems to ensure integrity and authenticity of internal system components, data, and/or externally interfaced devices. In addition, these certificates may be leveraged for secure communications, ensuring the confidentiality, integrity, and/or authenticity of messages. For example, an autonomous control system 2104 that implements and enforces electronic cryptographic PKI may include a read-only memory (ROM) partition that contains a public key or Globally Unique Identifier (GUID) that may be programmed during the system's initial fabrication. A private key may then be internally generated by the autonomous control system 2104, for example using industry standard cryptographic methods such as RSA and X.509 certificates, at the first boot-up of the autonomous control system 2104. This private key may then be used to generate a certificate request, which may be signed by the manufacturer's certificate authority (CA) or an approved third party CA. The signed certificate may then be securely stored on the ROM of the autonomous control system 2104. This certificate may then be used to enable digital signing and encryption/decryption of data. An autonomous control system 2104 that implements electronic cryptographic PKI may be retrofitted into a protected system 2100 that does not implement electronic cryptographic PKI in order to add such a capability. This may have the benefit of having the private key being stored in a location inaccessible to the protected system 2100 for added security.

In some embodiments, the autonomous control system 2104 may be used with an electronic cryptographic PKI to validate that internal protected system 2100 components are authentic, and other (internal protected system 2100 and/or external input device 2102) components may also be able to implement PKI so that public keys can be exchanged, stored, and authenticated. If a protected system 2100 or input device 2102 component that implements PKI was tampered with and replaced with a counterfeit version, then the autonomous control system 2104 may be able to detect the counterfeit because the counterfeit device's signature may either be non-existent or different from that of the original.

In some embodiments, the autonomous control system 2104 may utilize cryptographic methods (such as PKI) to ensure data integrity within a protected system 2100 and other (e.g., external input device 2102) system components. The autonomous control system may also implement cryptographic methods ensuring data has not been altered in any way. In addition, the authenticity of the data may be guaranteed, as the originator of the data may be proven or validated. For example, the autonomous control system 2104 may use a peripheral's public key to encrypt messages intended for the peripheral and verify messages received from the peripheral.

In some embodiments, the autonomous control system 2104 may implement electronic cryptographic PKI and may also ensure integrity and authenticity of virtual machines and or hypervisors (generally referred to as the "virtual system") by generating cryptographically signed hashes of the virtual system (or its components) and storing those hashes. The autonomous control system 2104 may then validate the authenticity and integrity of the virtual system by recalculating the hash and comparing it to the stored value. Furthermore, the autonomous control system 2104 may emulate the protected system 2100 full time, at predetermined or randomized time periods, and/or for predetermined or randomized durations, such that any commands received do not reach the protected system 2100, thereby preventing effects on the protected system 2100. This mode of operation may be used for testing or for giving an attacker the impression that an attack was successful when in reality the malicious intent was never actuated at the protected system 2100. The autonomous control system 2104 may include offensive measures which may neutralize a threat when prohibited connection states, commands, and/or sequences of commands are detected. For instance, if an unauthorized connection is detected on a USB port, then the autonomous control system 2104 may inject signals into the USB peripheral input device 2102 to damage or neutralize it.

In some embodiments, the autonomous control system 2104 may be an electronic circuit design on an integrated circuit chip which may be connected serially to the physical interface of a second integrated circuit chip in a control device in such a way that it has a negligible effect on system performance and function. At the same time, the first integrated circuit chip may be able to prohibit certain connection states to the second integrated circuit chip. The connection state may be the signal level on every connection point between two devices at a given instant of time such as the voltage level on every digital I/O connection. Alternatively, an electronic device may be inserted at or added onto a signal interface that may include external constant monitoring of some or all of the signal levels or states between one or more electronic devices or systems and acts to ensure that out of bounds signal states between devices or systems either do not occur or only occur for inconsequential amounts of time such that undesired system effects will not occur. An electronic device that implements this method may connect serially, in parallel, or both in serial and parallel between one or more devices or systems and may function independently or with external monitoring and control including with a computer-implemented security scoring method.

In some embodiments, the autonomous control system 2104 may operate as a hardware-based serial "man-in-the-middle" (MITM). Communication between the protected system 2100 and input device 2102 (e.g., a peripheral) may continue normally until the monitoring logic of the autonomous control system 2104 detects a pre-programmed prohibited signal pattern, packet, or access attempt on the signal lines. When the prohibited signal is detected, the autonomous control system 2104 may completely disable the primary signal bus by selecting an alternate signal bus (or disrupt bus). The alternate signal bus may be used for recording, disrupting, or total disconnection from the peripheral. The alternate signal bus may be selected while communication is maintained with the protected system 2100, for example to notify the protected system 2100 that it is under attack. The autonomous control system 2104 may maintain this communication by using an internal parameterized multiplexor instantiation whose channel select lines are controlled by the application-specific monitoring and action logic that is programmed into the protected system 2100, for example.

Figure 2:
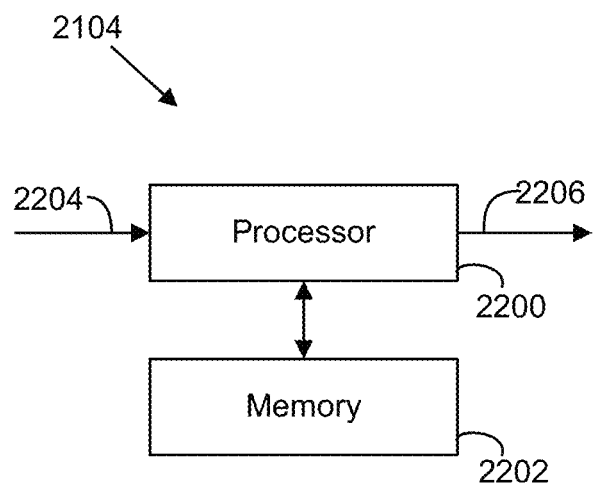
FIG. 2 is a serially interfaced autonomous control system according to an embodiment of the invention.

FIG. 2 illustrates an embodiment of the autonomous control system 2104 comprising a processor 2200 and a memory 2202 in a serial arrangement with an input device 2102 (not shown) and a protected system 2100 (not shown). The processor 2200 may receive input signals on node 2204, which may be connected to the input device 2102. The processor may generate output signals on node 2206, which may be routed to the protected system 2100. The memory 2202 may store prohibited input signal states. The processor 2200 may compare input signals to the prohibited input signal states and may produce a match signal or a no match signal. The input signals may be supplied to the protected system 2100 in response to the no match signal. Substitute input signals may be supplied to the protected system 2100 in response to the match signal. The substitute input signals may be signals that cause no damage to the protected system 2100. For example, an input to the protected system 2100 directing a motor of the protected system 2100 to operate at its highest speed may be detrimental to a particular process operation and should not be allowed. If such a command is input from the input device 2102, the autonomous control system 2104 may intercept the signal and take immediate action to prevent the unauthorized state. In this example, the autonomous control system 2104 may take control of the speed selection entirely and send an appropriate signal to the protected system 2100 that maintains the previous authorized speed selection. In addition, the autonomous control system 2104 may create a log entry or send an alert that an unauthorized connection state was attempted. The response of the autonomous control system 2104 may be application dependent and may be pre-programmed. The autonomous control system 2104 may also be programmed to stop the physical process instead of holding the current speed, for example.

Figure 3:
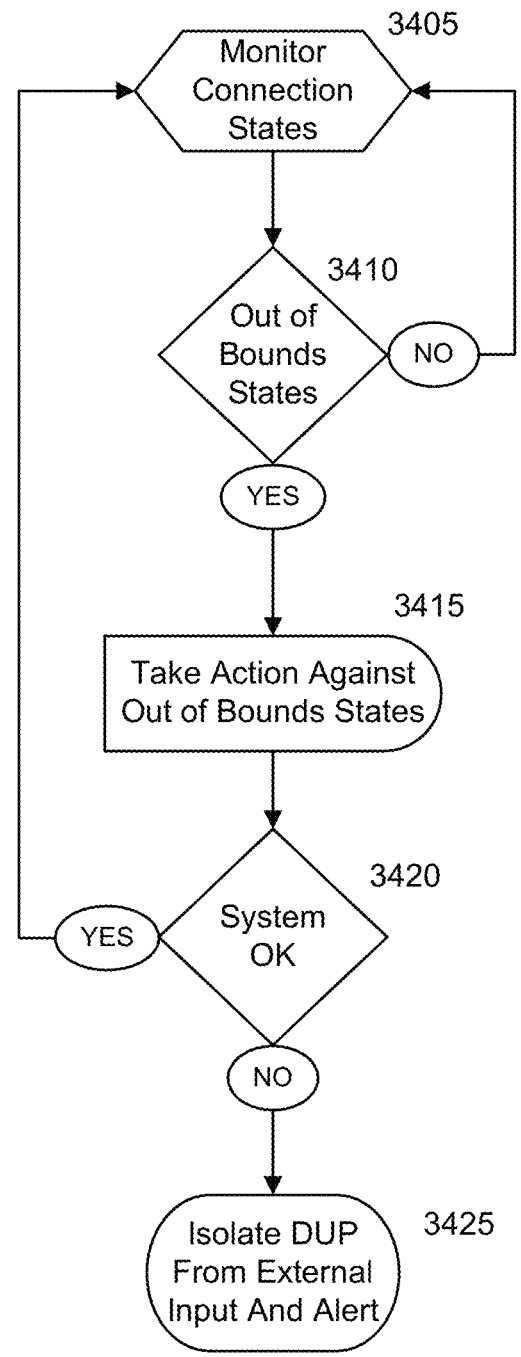
FIG. 3 is a flow diagram depicting a control method according to an embodiment of the invention.

FIG. 3 is a flow diagram depicting a control method according to an embodiment of the invention. This diagram presents an example process flow for the serial autonomous control system 2104 embodiment discussed above. The example process flow may also apply to additional serial and/or parallel autonomous control system 2104 embodiments discussed below, which may or may not include the processor 2200 and memory 2202 of FIG. 2. The autonomous control system 2104 may monitor connection states 3405 between the protected system 2100 and input device 2102. A state may be checked to determine whether it is out of bounds 3410 (e.g., a maximum speed command from the example of FIG. 2 above). If the state is allowed, monitoring may continue normally 3405. If the state is out of bounds, the autonomous control system 2104 may take action against the state 3415 (e.g., by setting the speed to a lower speed than the commanded speed or by instructing the protected system 2100 to maintain its current speed). The autonomous control system 2104 may determine whether its intervention set or restored the protected system 2100 to an acceptable state 3420. For example, the autonomous control system 2104 may determine whether a motor has actually reverted to a lower speed with no damage done. If the protected system 2100 is OK, monitoring may continue normally 3405. However, in some cases, it may be impossible to revert a protected system 2100 to an acceptable state. For example, if the protected system 2100 is a lock, and it receives an unlock command before the autonomous control system 2104 can intervene (e.g., in a parallel arrangement such as that described with respect to FIG. 7 below), a door controlled by the lock may already be opened. Locking the lock again will not fix this condition. In this case, the protected system 2100 may be isolated from further external input, and an alert may be generated 3425.

Figure 4:
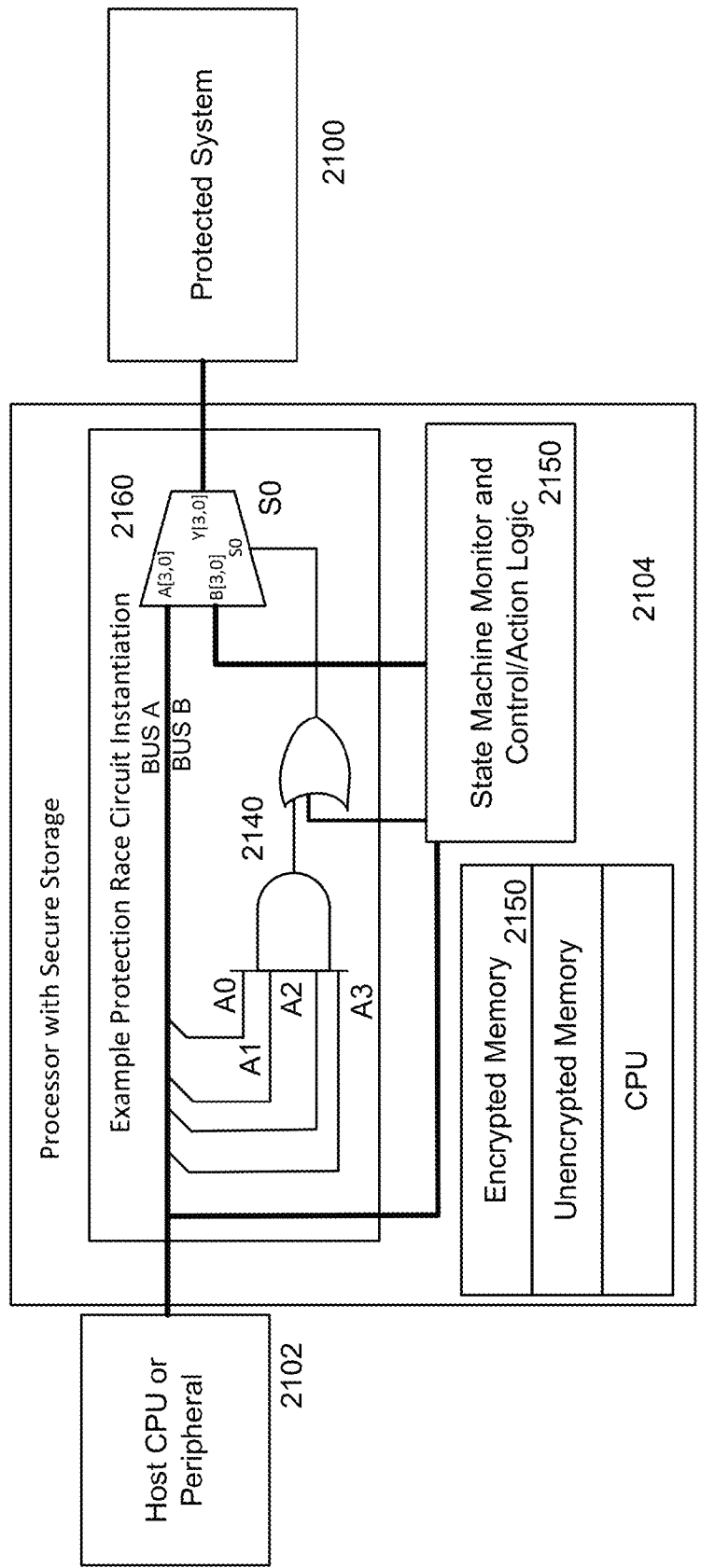
FIG. 4 is a serially interfaced autonomous control system according to an embodiment of the invention.

FIG. 4 is block diagram of an autonomous control system 2104 connected with a serial interface between a protected system 2100 and an input device 2102, according to an embodiment of the invention. This embodiment may function similarly to that of FIG. 2 discussed above, but may have other elements in addition to and/or in place of the processor 2200 and memory 2202 within the autonomous control system 2104. In this example, the autonomous control system 2104 may include a programmable logic device (PLD) or other device (e.g., a circuit, a processor, etc.) providing monitoring logic 2140. The monitoring logic 2140 may normally pass all signals between the protected system 2100 and a peripheral 2102 through a bidirectional multiplexor (MUX) 2160. The same signals may also be fed into a monitoring and action circuit providing control logic 2150 which may be part of the PLD, circuit, or processor providing the monitoring logic 2140 or may be separate from the monitoring logic 2140 (e.g., a separate PLD, circuit, processor, etc.). The embodiment depicted in this figure is a hardware-based serial "man-in-the-middle" (MITM) implementation of the autonomous control system 2104. In this embodiment, communication between the protected system 2100 and peripherals 2102 may continue normally until the monitoring logic 2140 detects a preprogrammed prohibited signal pattern, packet, or access attempt on the signal lines. When the prohibited signal is detected, control logic 2150 in the autonomous control system 2104 may completely disable the primary peripheral I/O bus by selecting an alternate internal I/O bus (or disrupt bus) for recording, disrupting, or total disconnection from the peripheral 2102. This method may be implemented in the autonomous control system 2104 while communication is maintained with the protected system 2100 to notify the protected system 2100 that it is under attack. The autonomous control system 2104 may maintain this communication by using an internal parameterized multiplexor 2160 instantiation whose channel select lines are controlled by the application-specific monitoring and action logic that is programmed into the protected system 2100.

The autonomous control system 2104 of FIG. 4 may be connected in series at the physical layer between a protected system 2100 CPU and a connected peripheral 2102 that can be internal or external to the protected system 2100. The communication bus may pass through an autonomous control system 2104 comprising the monitor logic 2140 and MUX 2160 that is programmed to detect signals that violate rules for a given application. When such signals are detected, autonomous control system 2104 may stop them from reaching the protected system 2100 or at least prevent them from asserting at the protected system 2100 for a length of time that is undesirable for a process. In the example of FIG. 4, Bus A may normally pass through autonomous control system 2104 between the protected system 2100 CPU and the peripheral 2102 and carry signals to and from the protected system 2100 CPU. In doing so, Bus A may pass through the output multiplexor 2160 of autonomous control system 2104. Whether Bus A or B reaches the protected system 2100 may be determined by the S0 control port of the multiplexor 2160. When the S0 port is a logical 0, Bus A may pass through. When the S0 port is a logical 1, Bus B may pass through. The value of each line of Bus B may be controlled by autonomous control system 2104's state machine control logic 2150 that may be configured to enforce rules. In this example, S0 can assert to a logical 1 when all of the lines of Bus A are high. The 4-input AND gate may toggle S0 to switch to Bus B in response. The AND gate may be a hardware gate, and propagation times through hardware AND gates may be on the order of nanoseconds, so a near-instantaneous switch may be performed. S0 can also be controlled directly by autonomous control system 2104's state machine logic 2150 via the 2-input OR gate that feeds S0. Multiple instances of the autonomous control system 2104 can be interposed between various inputs and/or outputs of the protected system 2100 and input device 2102 to enforce a variety of rules on a variety of interfaces.

Also shown in FIG. 4 is a secured memory 2151 which may store and encrypt data. The memory may be employed as an autonomous control system 2104 system service to the host CPU and/or may contain data isolated from the host CPU such as a log of rule violation events which may be read out from a secure application or external peripheral.

The autonomous control system 2104 depicted in the example of FIG. 4 may be arranged in a serial interface using a programmable logic device with the feature that the induced signal propagation delay through the autonomous control system 2104 for the monitored lines is negligible for system timing requirements. The PLD in the autonomous control system 2104 may include a normal "pass-through" mode that adds a small amount of propagation delay, for example a delay on the order of twenty nanoseconds. The added delay may be inconsequential for many systems and therefore may not affect normal system operation.

The serial interface of the autonomous control system 2104 depicted in the example of FIG. 4 may be able to partially or completely disconnect the protected system 2100 from a peripheral 2102 to electrically isolate the protected system 2100 as an anti-tamper measure. The autonomous control system 2104 may then output any offensive, defensive, or diagnostic/repair signals to an attacking or malfunctioning peripheral 2102, or simply hold state.

Figure 5:
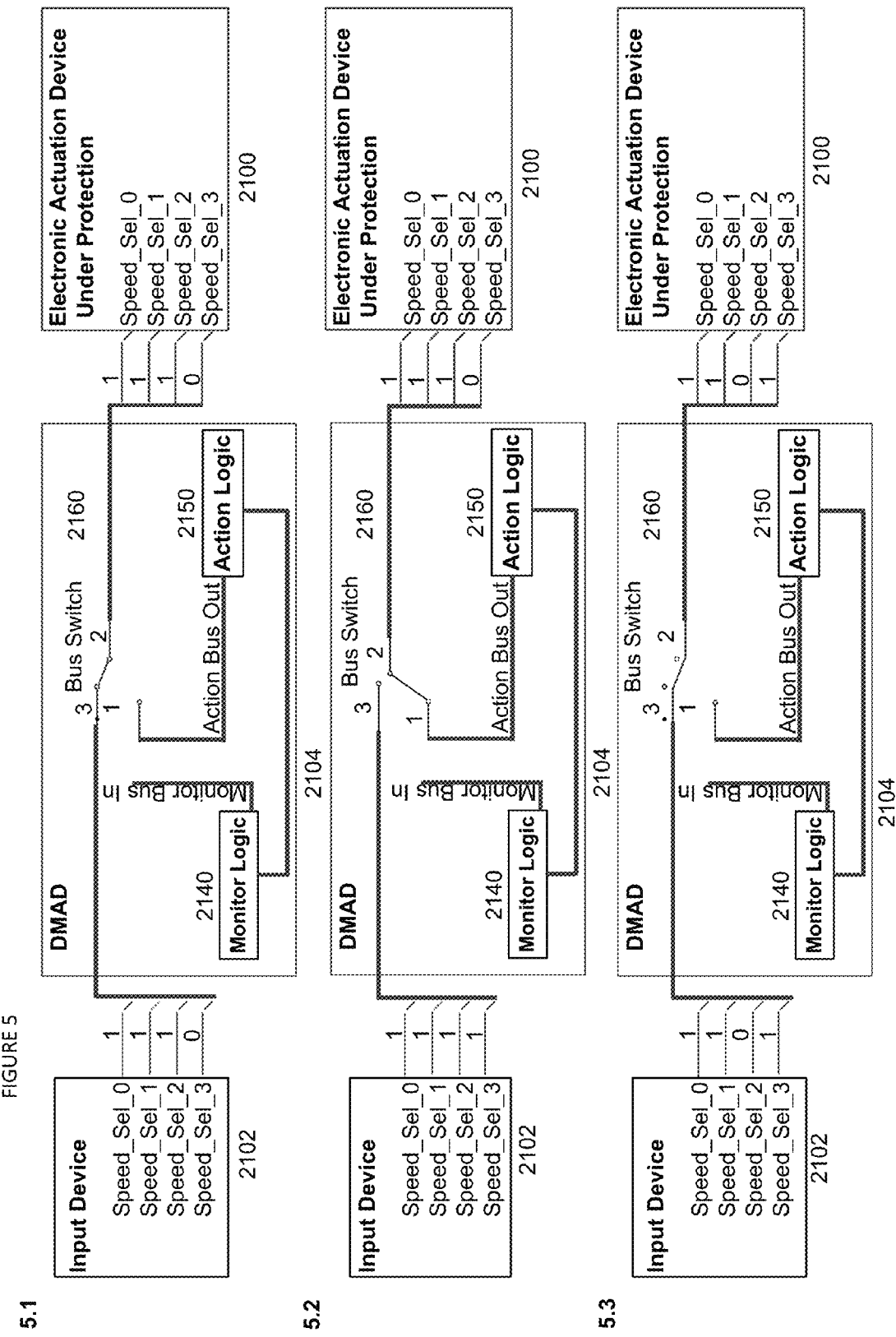
FIG. 5 is a schematic diagram depicting operation of a serially interfaced autonomous control system according to an embodiment of the invention.

FIG. 5 is a schematic diagram depicting operation of an electronic autonomous control system 2104 with a serial interface preventing an unauthorized connection state according to an embodiment of the invention. The autonomous control system 2104 may be positioned between a speed selection input device (peripheral 2102) and an actuation device (protected system 2100) that accepts a binary encoded speed to apply to a physical process. The autonomous control system 2104 may include monitoring logic 2140 to monitor inputs and pass them to a multiplexer (MUX) or switch 2160. If the inputs are allowed, they may proceed from the MUX 2160 to the protected system 2100. If the inputs are not allowed, the state machine monitor and control action logic 2150 may intervene and cause the MUX 2160 to pass an output generated by the state machine monitor and control action logic 2150 to the protected system 2100 instead. In this example, the highest speed, represented by binary "1111", is detrimental to a particular process operation and should not be allowed. The device depicted in FIG. 5 can be scaled to monitor and act upon a large number of connection states that encode a wide variety of different functions. The autonomous control system 2104 in this example may also be programmed to prevent unauthorized sequences of speed selections such as jumping immediately from the lowest to the highest allowed speed, for example. Autonomous control system 2104 logic may be application specific, so while "1111" is a forbidden input in this example, other inputs may be forbidden in other embodiments. Inputs to the autonomous control system 2104 are not limited to the 4-bit embodiment of this example.

In FIG. 5.1, a speed selection bus serially passes signals through the autonomous control system 2104 and on to the actuation device via the autonomous control system 2104's "bus switch". The autonomous control system 2104 may monitor the speed selection bus for programmable unauthorized speeds (connection states) and take a pre-programmed action, in this example controlling the bus switch. In FIG. 5.1 the selected speed is an authorized speed, therefore the autonomous control system 2104 allows the selection to pass through to the actuation device.

FIG. 5.2 depicts an unauthorized signal for speed, "1111", transmitted to the autonomous control system 2104 through an input device 2102 either inadvertently or maliciously. The autonomous control system 2104 may intercept the signal and take immediate action to prevent the unauthorized state. In this example, the autonomous control system 2104 may include pre-programmed action logic to toggle the bus switch such that the autonomous control system 2104 takes control of the speed selection entirely and sends an appropriate signal to the protected system 2100 that maintains the previous authorized speed selection. In addition, the autonomous control system 2104 may create a log entry or send an alert that an unauthorized connection state was attempted. The response of the autonomous control system 2104 may be application dependent and may be pre-programmed. The autonomous control system 2104 may also be programmed to stop the physical process instead of holding the current speed, for example.

FIG. 5.3 illustrates that when the input device 2102 is re-adjusted by a user or a control system to select an authorized speed, the autonomous control system 2104 logic may switch control back to the input device 2102 by toggling the bus switch back to a default steady-state position.

Figure 6:
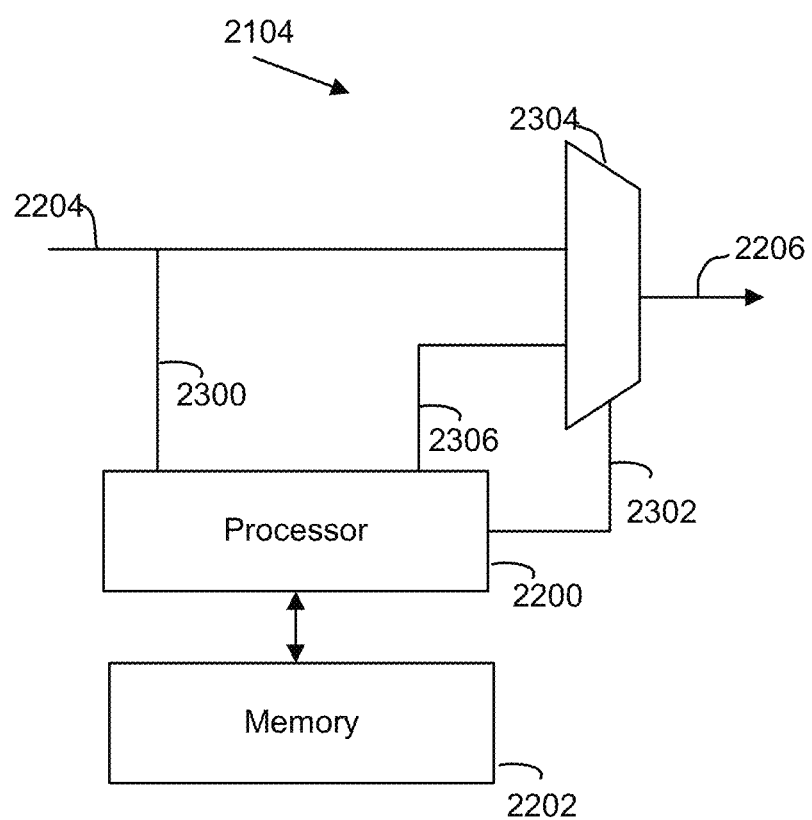
FIG. 6 is a serially interfaced autonomous control system according to an embodiment of the invention.

FIG. 6 illustrates an embodiment of the autonomous control system 2104 similar to the embodiment of FIG. 5, but with a processor 2200 and memory 2202 in place of hardware logic. In this embodiment, input signals on node 2204 may be routed to processor 2200 via link 2300. The processor 2200 may compare input signals to prohibited input signal states stored in memory 2202 and produce a match signal or a no match signal. The processor 2200 may produce select signals on line 2302, which may control MUX 2304. Select signals may allow the signals on line 2204 to pass through the multiplexer 2304 to the protected system 2100 (not shown) via line 2206 in the event of a no match signal. Substitute input signals may be applied to line 2306 and select signals on line 2302 may pass the substitute input signals through the MUX 2304 in the event of a match signal.

Figure 7:
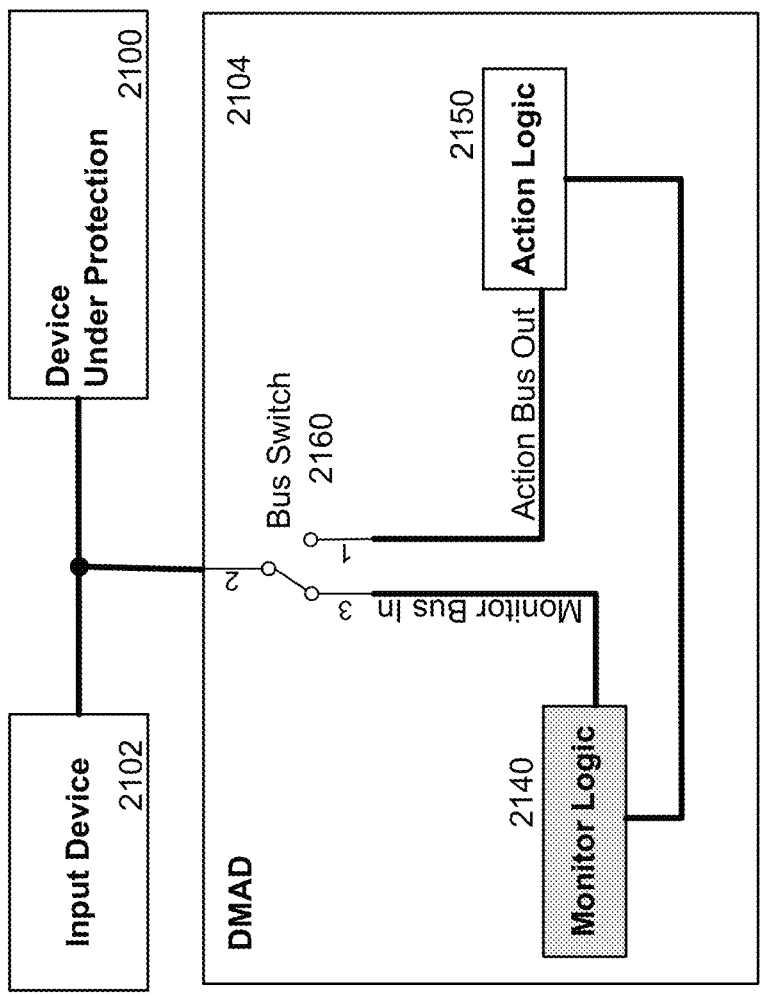
FIG. 7 is a parallel interfaced autonomous control system according to an embodiment of the invention.

FIG. 7 is a block diagram of an autonomous control system 2104, including a programmable logic device (PLD) 2140/2150, connected with a parallel interface to a protected system 2100, according to an embodiment of the invention. The inputs and/or outputs of the protected system 2100 may be monitored via the inputs of the PLD in the autonomous control system 2104 or via a processor embedded in the autonomous control system 2104. In the embodiment shown in FIG. 7, the autonomous control system 2104 may be connected with a parallel interface to the protected system 2100 and may include at least one bidirectional signal driver that can monitor inputs, internally change state to outputs, and cause disruption with no extra connections needed. The driver may be coupled to monitoring logic 2140 to monitor inputs received via switch 2160 of the driver. If the inputs are allowed, the driver may maintain its state. If the inputs are not allowed, the action logic 2150 may throw the switch 2160 to an action bus out, which may be a ground or a high signal, for example. Communication between the protected system 2100 and peripherals 2102 may proceed normally until the monitoring logic detects an unauthorized signal pattern, packet, or access attempt, as in the serial interface example described above. In a parallel configuration, the control logic cannot internally re-route or disconnect the I/O bus by switching in an alternate I/O path for recording, disrupting, or total disconnection from the peripheral 2102. Instead, the signal to the device under protection 2100 is grounded or set high by the switch 2160. However, the parallel approach may be useful for very high-speed systems with communication and signal speeds where propagation delays may not be tolerated (e.g., systems that operate in the GHz range). Furthermore, the parallel autonomous control system 2104 may require fewer overall I/O connections than a serial interface because it does not have to pass signals through itself (requiring a matching output for every input).

Figure 8:
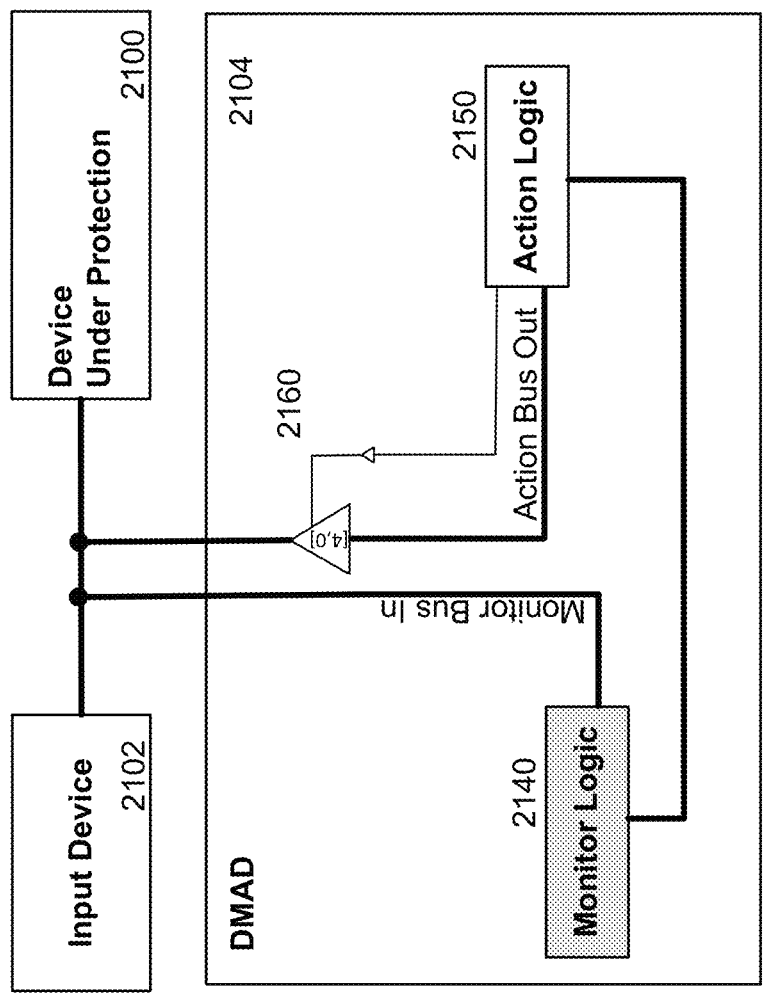
FIG. 8 is a parallel interfaced autonomous control system according to an embodiment of the invention.

FIG. 8 is a block diagram of an embodiment of the autonomous control system 2104 connected with a parallel interface to the protected system 2100 and including at least one tri-state output 2160 connected to the peripheral bus from the autonomous control system 2104 (in place of the switch of FIG. 7) that may toggle to logic high or low when commanded in an effort to cause I/O disruption. This tri-state output may be used for autonomous control systems 2104 that do not have bidirectional I/O interfaces.

Figure 9:
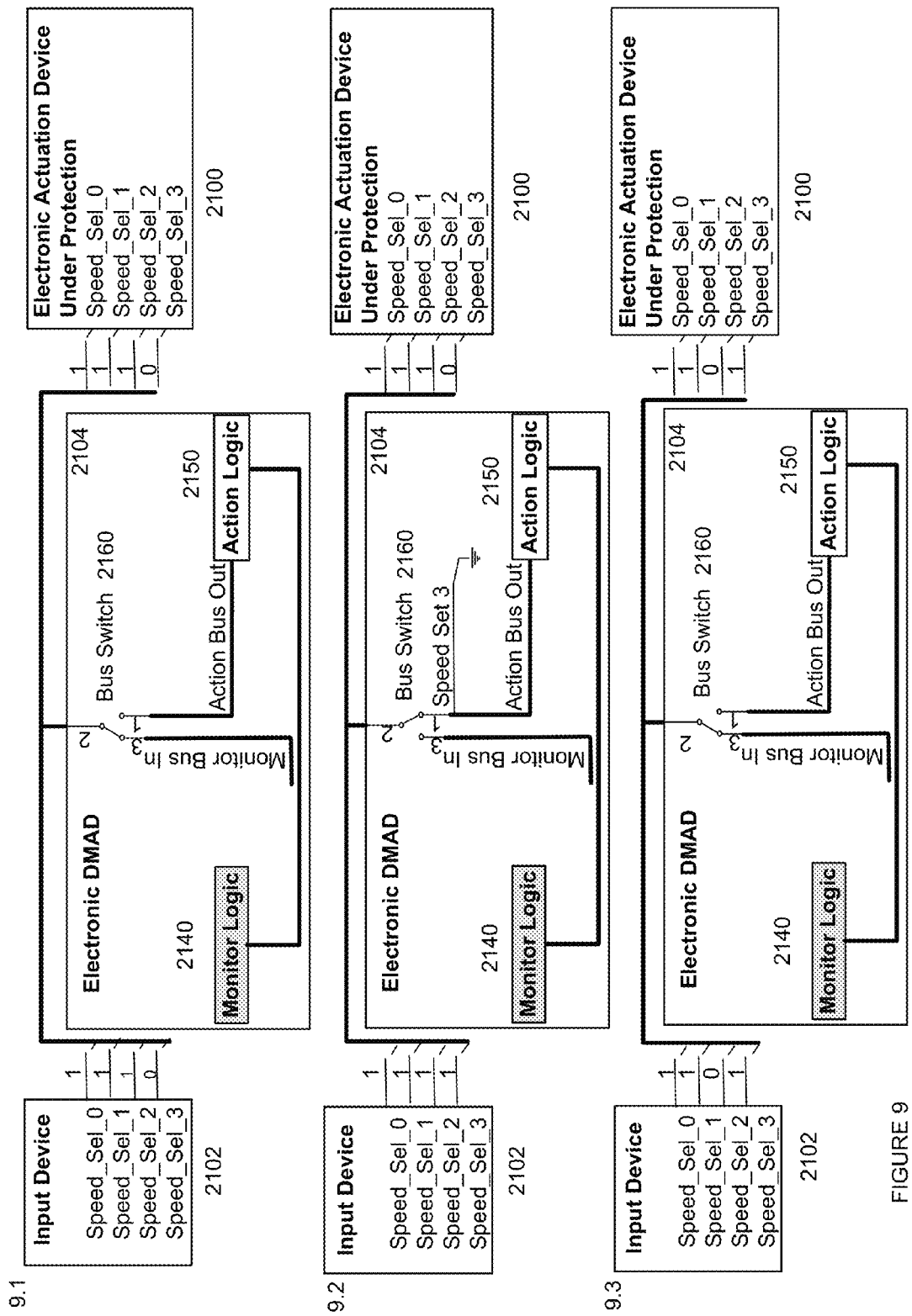
FIG. 9 is a schematic diagram depicting operation of a parallel interfaced autonomous control system according to an embodiment of the invention.

FIG. 9 is a schematic diagram depicting operation of an electronic autonomous control system 2104 with a parallel interface according to an embodiment of the invention. The autonomous control system 2104 may include a parallel interface where the signals between the input device 2102 and protected device 2100 do not pass directly through the autonomous control system 2104. Instead, the autonomous control system 2104 may tap off of each line with electrically high-impedance inputs to monitor the input signal as shown in FIG. 9.1. When an unauthorized input attempt is made, the parallel autonomous control system 2104 may disrupt the unauthorized input by toggling the bus switch to an output bus having a drive-strength (current sinking and sourcing) suitable to override the host bus. In the example of FIG. 9.2, internally grounding the Speed_Sel_3 line may prevent it from reaching a logical high state that in turn selects the highest process speed. In FIG. 9.2, the autonomous control system 2104 may periodically toggle the bus switch back to position 3 to monitor input from the input device 2102 without interference from the autonomous control system 2104 action bus output. When the autonomous control system 2104 detects that an authorized speed is selected, it can move back to steady-state as shown in FIG. 9.3. The autonomous control system 2104 with a parallel interface may not simultaneously monitor the signals, unlike the autonomous control system 2104 with the serial interface.

Figure 10:
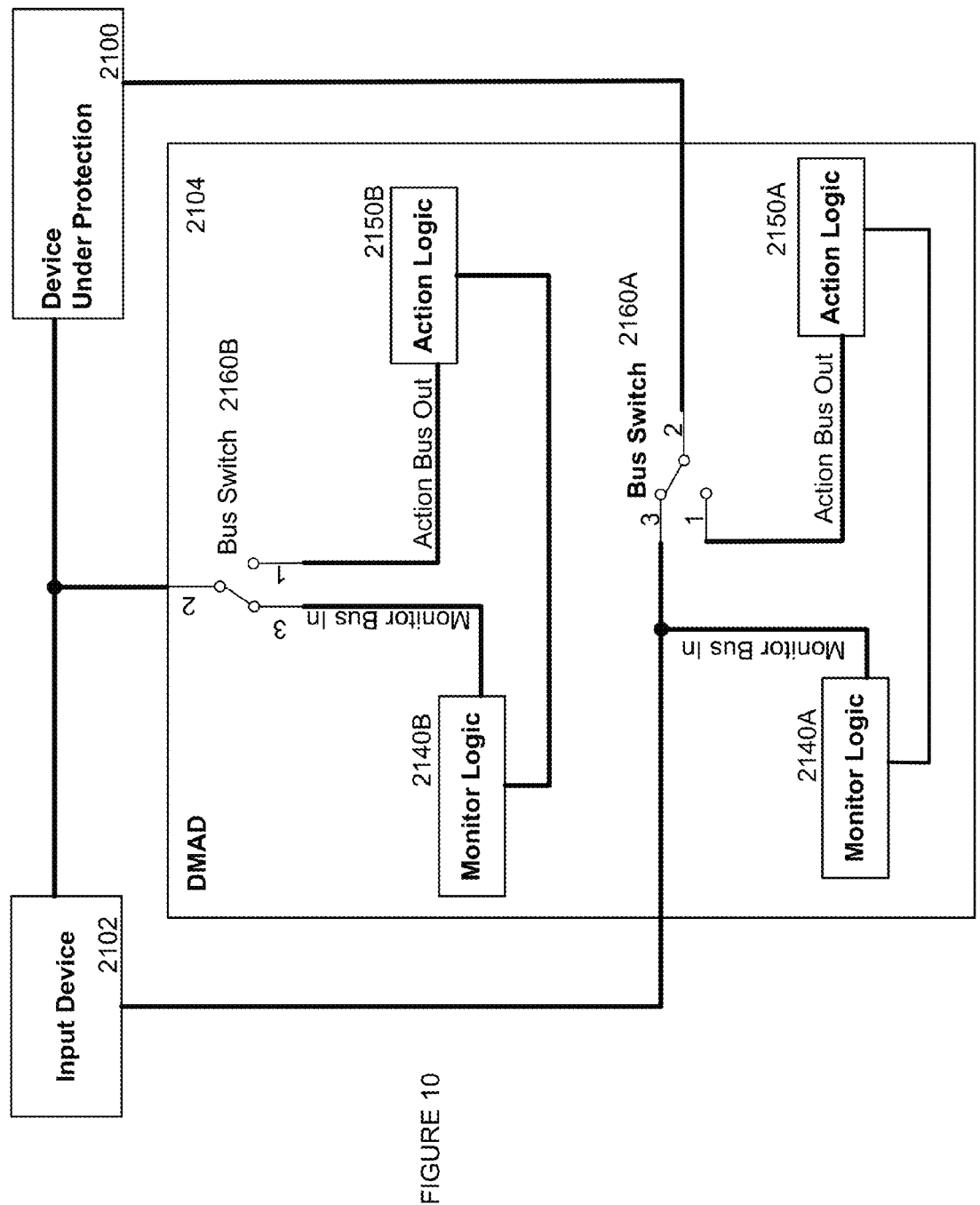
FIG. 10 is a serially and parallel interfaced autonomous control system according to an embodiment of the invention.

FIG. 10 is a block diagram of an embodiment in which the autonomous control system 2104 is connected to the protected system 2100 utilizing both a serial and a parallel interface. The serial interface includes monitor logic 2140A, action logic 2150A, and switch 2160A. The parallel interface includes monitor logic 2140B, action logic 2150B, and switch 2160B. In this embodiment, when certain communication paths are too fast to pass serially without degrading normal system operation, those paths may be handled by the parallel interface. Slower paths may be handled by the serial interface.

Figure 11:
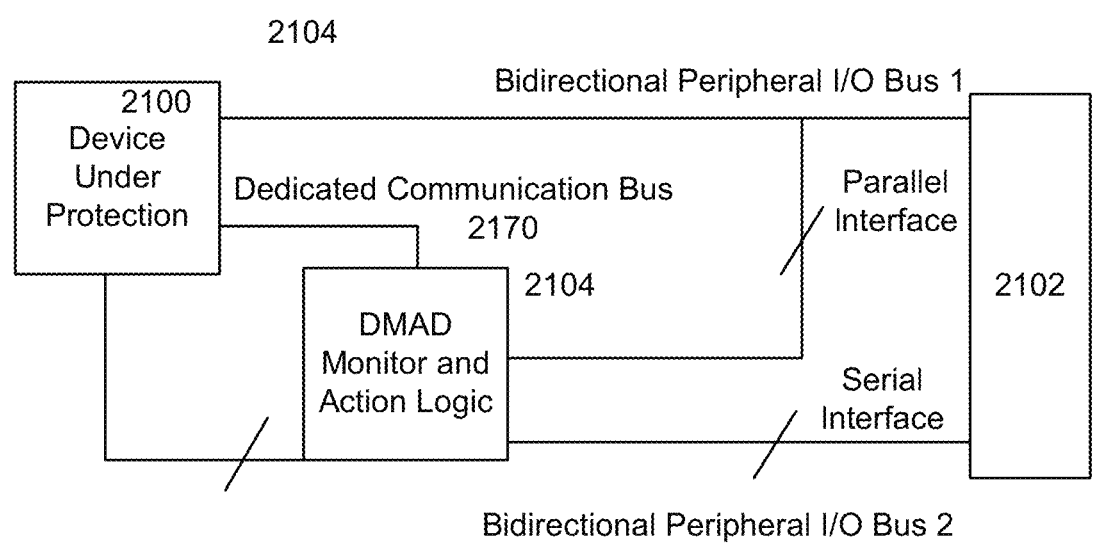
FIG. 11 is an autonomous control system comprising a communication bus according to an embodiment of the invention.

FIG. 11 is a block diagram of an embodiment in which the autonomous control system 2104, regardless of interface, includes a communication bus 2170 between the autonomous control system 2104 and protected system 2100. The communication bus 2170 may include a function to optionally flag the protected system 2100 if malicious or unauthorized intent is detected. The communication bus may also include functions for logging, alerting, or disabling at least one peripheral 2102. Further, the communication bus 2170 may log events autonomously and report such events to a computer-implemented security scoring system.

FIG. 12 is a diagram of an embodiment in which the autonomous control system 2104 includes a semiconductor multi-chip module which may include at least two interconnected processor dies functionally connected in a stack or a planar array. The module may also include an interposer board and/or a direct wire bonding inside of a single semiconductor package that mounts directly to a printed circuit board (PCB). One advantage of this arrangement may make it difficult to visually detect the autonomous control system 2104, which may provide protection against malicious tampering.

FIG. 13 is a diagram of an embodiment in which the autonomous control system 2104 is mounted externally on an interposer PCB, which may include a custom socket assembly that may be functionally arranged in a stack either above or below the protected system 2100. In this embodiment, the autonomous control system 2104 may be used to secure existing CPUs and use existing motherboards and sockets made for the CPUs. This implementation may be referred to as a package-on-package implementation because it involves connecting two individually packaged components to form a single module.

In some embodiments, the autonomous control system 2104 may include an electronic circuit that may be surface mounted on a printed circuit board (PCB) that may include the protected system 2100. The autonomous control system 2104 may be operably connected to the protected system 2100 using one or more PCB traces, flying leads, coaxial cables, or fiber optics, for example.

In some embodiments, the autonomous control system 2104 may include a modular stackable single board-computing platform that may be operably mounted on the protected system 2100. For example, the platform may be a PC104, EPIC, EBX, Raspberry Pi, Parallella, or a similar modular computing platform. In this embodiment, the autonomous control system 2104 may include a modular carrier that may attach to a modular computing stack header and perform the securing functions described above. This may be referred to as a module-on-module implementation.

Figure 14:
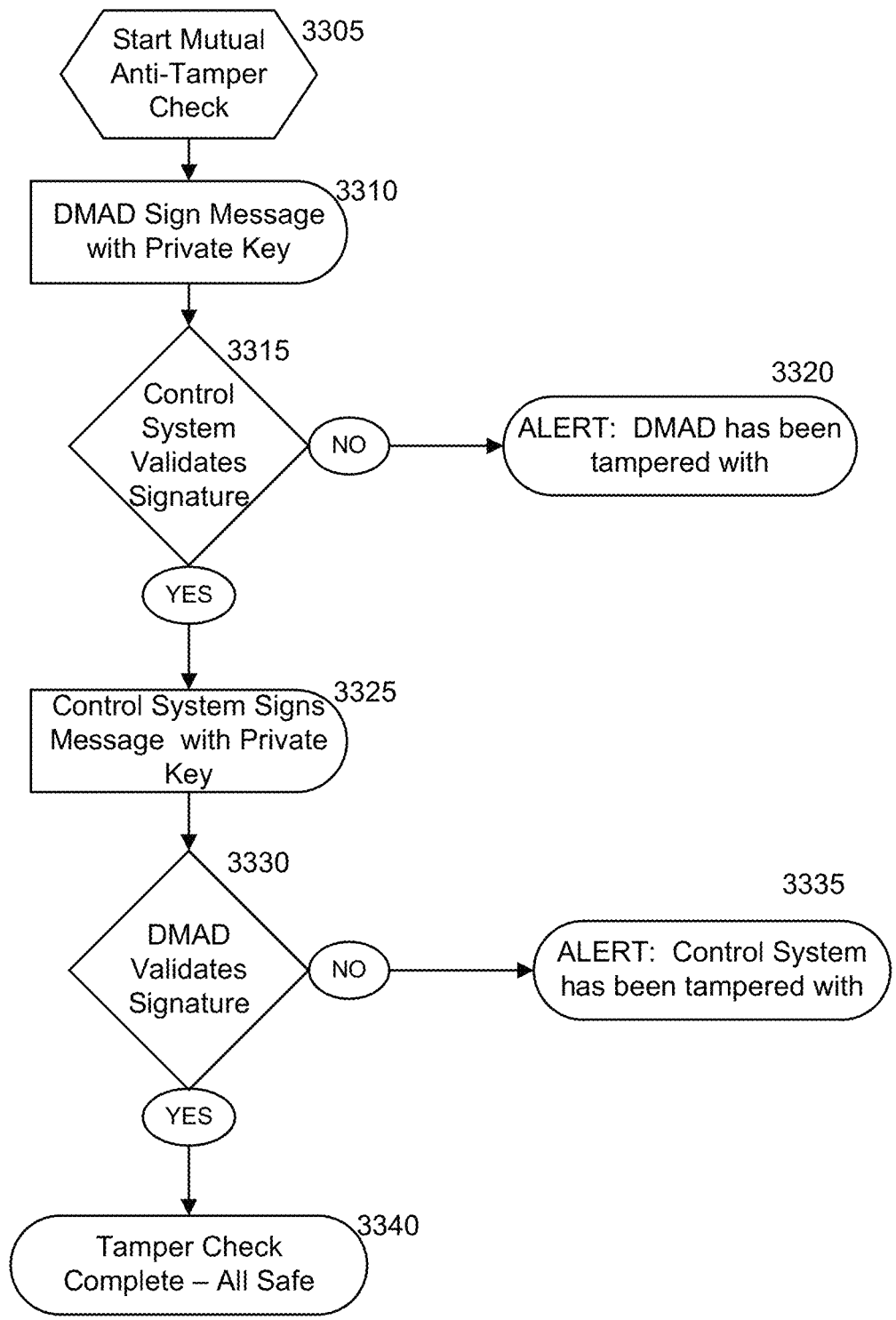
FIG. 14 is a flow diagram depicting anti-tamper features of an autonomous control system according to an embodiment of the invention.

FIG. 14 is a flow diagram depicting anti-tamper features of the autonomous control system 2104 according to an embodiment of the invention. As noted above, data may be stored to enable cryptographic anti-tamper checks of the autonomous control system 2104. Periodically, or upon user request, an anti-tamper check may be initiated 3305. The autonomous control system 2104 may sign a message to a system in communication with the autonomous control system 2104 (i.e., the system performing the check of the autonomous control system 2104) with a private key 3310. The system performing the check may attempt to validate the signature 3315. If the signature is invalid, an alert may be generated indicating that the autonomous control system 2104 may have been tampered with 3320. If the signature is valid, the system performing the check may sign a message with a private key 3325. The autonomous control system 2104 may attempt to validate the signature 3330. If the signature is invalid, an alert may be generated indicating that the system performing the check may have been tampered with 3335. If the signature is valid, the tamper check may be declared all safe (i.e., both the checking system and the autonomous control system 2104 may be tamper free) 3340. Thus, the autonomous control system 2104 may check another system and be checked by that system to provide mutual security.

Figure 15:
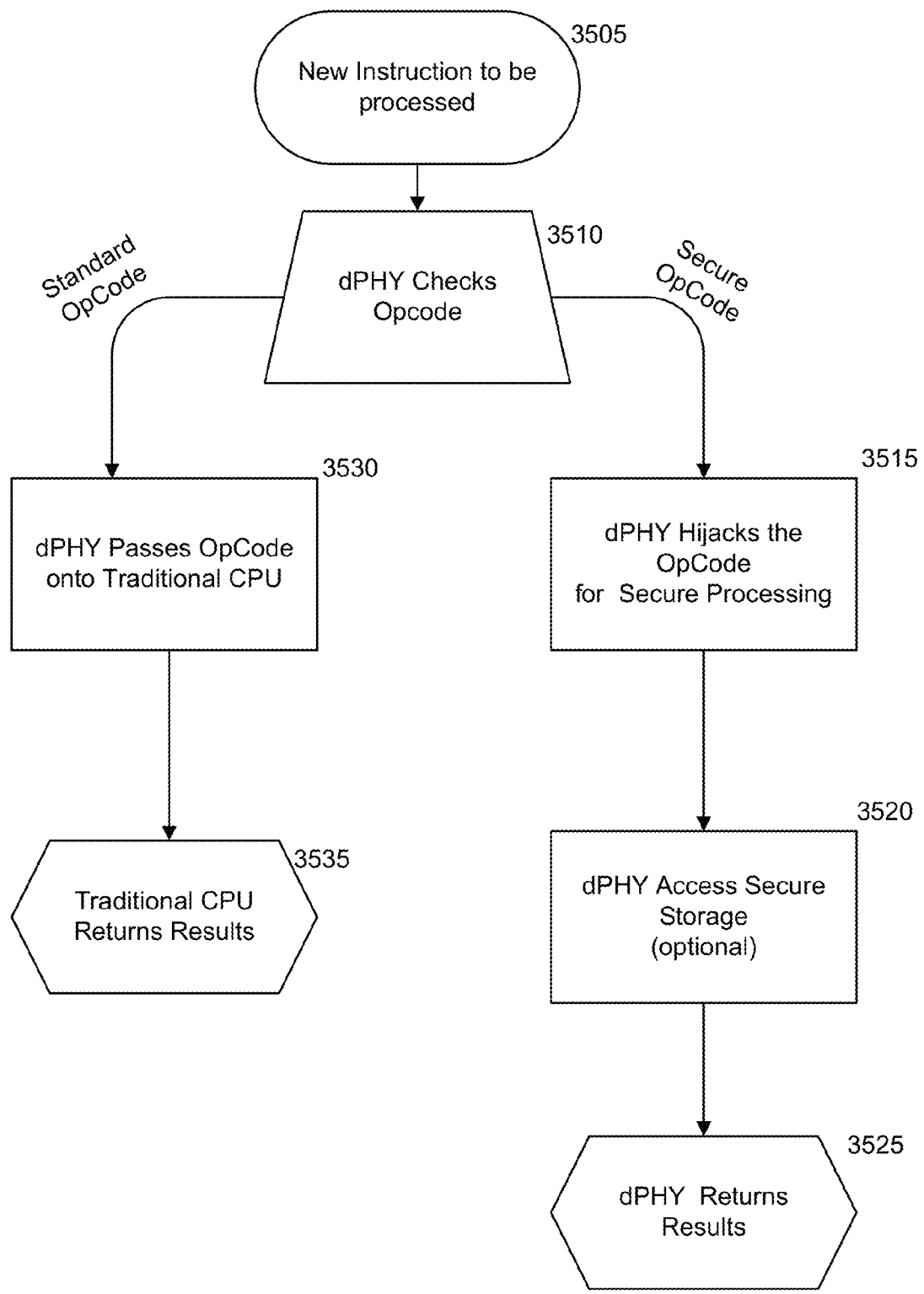
FIG. 15 shows a process flow of using an autonomous control system as a system service to a host CPU for secure co-processing according to an embodiment of the invention.

FIG. 15 shows a process flow of using the autonomous control system 2104 as a system service to a host CPU for secure co-processing according to an embodiment of the invention. The architecture described above for the autonomous control system 2104 may also enable secure processing as a system service to a host CPU since an autonomous control system 2104 processor may have multiple instantiations of autonomous control systems. In this embodiment, the autonomous control system 2104 may receive an instruction 3505. The autonomous control system 2104 may compare the received instruction (e.g., from the input device 2102) as reduced to machine language by a compiler, or opcode, 3510 to find a match to a pre-programmed opcode residing in a memory associated with the autonomous control system 2104 memory sub-system. If there is a match, then the autonomous control system 2104 may execute the opcode's pre-programmed function 3515, and the protected system 2100 may not receive the opcode. The autonomous control system 2104 may access secure storage 3520 and return results 3525. Alternately, if there is no match to the received opcode within autonomous control system 2104 pre-programmed memory, then the opcode may be passed to the protected system 2100 for execution 3530, and the protected system 2100 may return results 3535. Software applications specifically designed to work with autonomous control system 2104 executing on input device 2102 may be required to contain autonomous control system 2104 specific opcodes or instruction sets to access the secure co-processing capability of autonomous control system 2104. For example, if such a autonomous control system 2104 specific opcode or series of opcodes were to request a cryptographic signature on a data set, processor 2200 may respond by first performing a cryptographic hash on the data set. Processor 2200 may then digitally sign the hashed dataset using its private key (stored in secure storage 2202), and then return the signed data set back to the autonomous control system 2104 specific application that had generated the opcode in question via input device 2102.

Autonomous Control Systems and Methods Employing QSM

Figure 16:
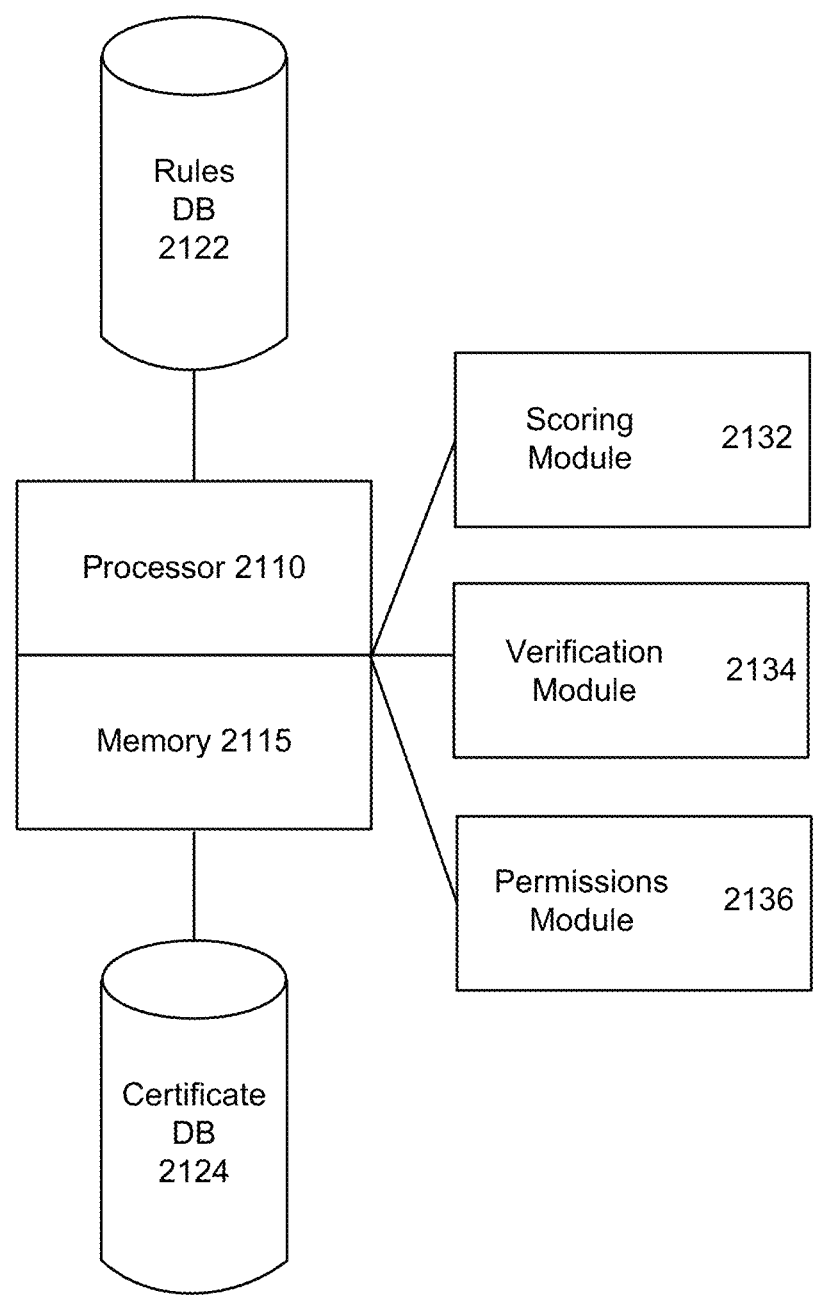
FIG. 16 is a security module according to an embodiment of the invention.

FIG. 16 is a security module 2100 according to an embodiment of the invention. The security module 2100 may include a processor 2110 and physical memory 2115, for example a rules database 2122 and/or a certificate database 2124. Thus, the processor 2110 and the Modules 2132, 2134 and 2136 may be coupled to, part of, or the same element as the processor 2200 of the autonomous control system 2104. Likewise, the rules database 2122 and/or certificate database 2124 and/or Memory 2115 may be stored within the secure storage 2202 of the autonomous control system 2104.

The rules database 2122 may store various access control rules as described in greater detail below. The certificate database 2124 may store various certificates for devices, documents, users, etc., as described in greater detail below. The security module 2100 may also include sub-modules such as a scoring module 2132 which may derive and/or update security scores, a verification module 2134 which may determine whether security rules are met, and/or a permissions module 2136 which may automatically or manually define security rules and/or access permissions. Note that any device described herein as performing security validations or as a QSM enabled device or QSM device may include a security module 2100 and may use the security module 2100 to perform the validations and/or other processes related to QSM as described.

Figure 17:
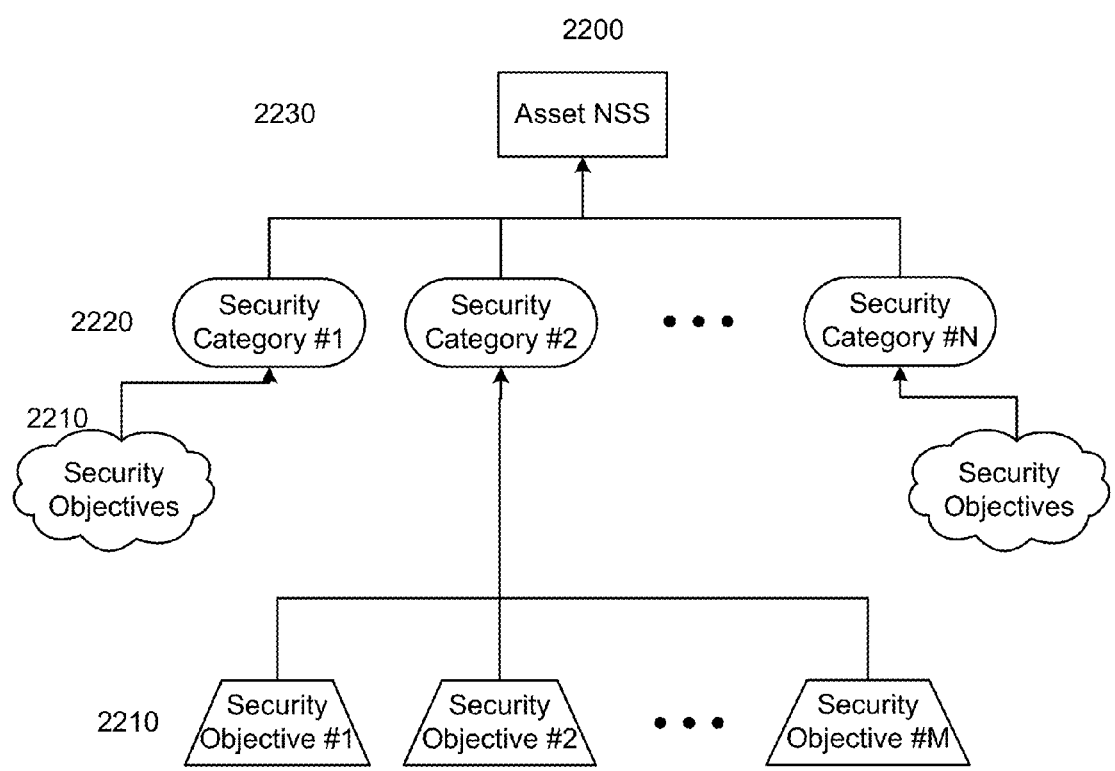
FIG. 17 is a security score derivation according to an embodiment of the invention.

FIG. 17 is a security score derivation 2200 according to an embodiment of the invention. An evaluation process may be conducted on an asset to determine its security level. To achieve this result, a normalized security score representing the security level of the asset may be generated at the conclusion of the evaluation. The score may be normalized through a process that applies a predetermined set of security criteria ("security objectives") 2210 against the asset's primary functions (what it does, its purpose) isolated by predefined grouping ("security category") 2220 for assessment purposes. For each security objective 2210, an assessment may be conducted on each of the asset's security categories, and a security score may be generated (the "security objective score, SOS") that falls within a range assigned to the security objective. A degree of importance for each score may vary from asset to asset or even instance to instance. When all of the objective scores have been generated, they may be combined using a predefined objective score aggregation method (e.g., a weighted average), resulting in a normalized security score ("NSS") 2230.

Figure 18:
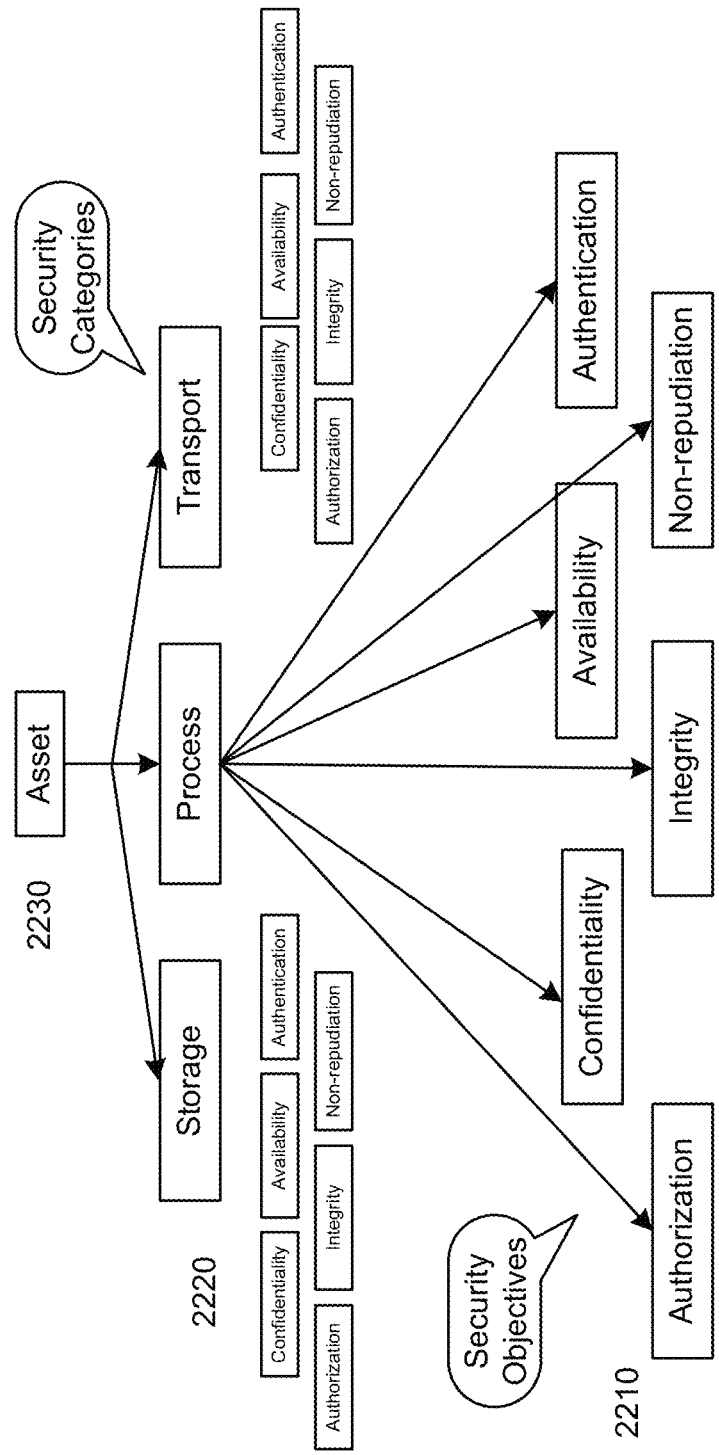
FIG. 18 is an asset breakdown according to an embodiment of the invention.

FIG. 18 is an asset (and its breakdown) 2230 according to an embodiment of the invention, showing specific examples of security categories 2220 and security objectives 2210 that may be used in some embodiments. For example, an asset 2230 may have storage, process, and transport security categories 2220, which may correspond to primary functions performed by the asset 2230 (e.g., data storage, data processing, and data transport). Each of the security categories 2220 may have authorization (AZ), confidentiality (C), integrity (I), availability (AV), non-repudiation (NR), and authentication (AI) security objectives 2210. An NSS for the asset 2230 may provide an indication of how well the asset 2230 meets the security objectives 2210 overall, based on how well each of the functional categories associated with the security categories 2220 score on the security objectives 2210.

Figure 19:
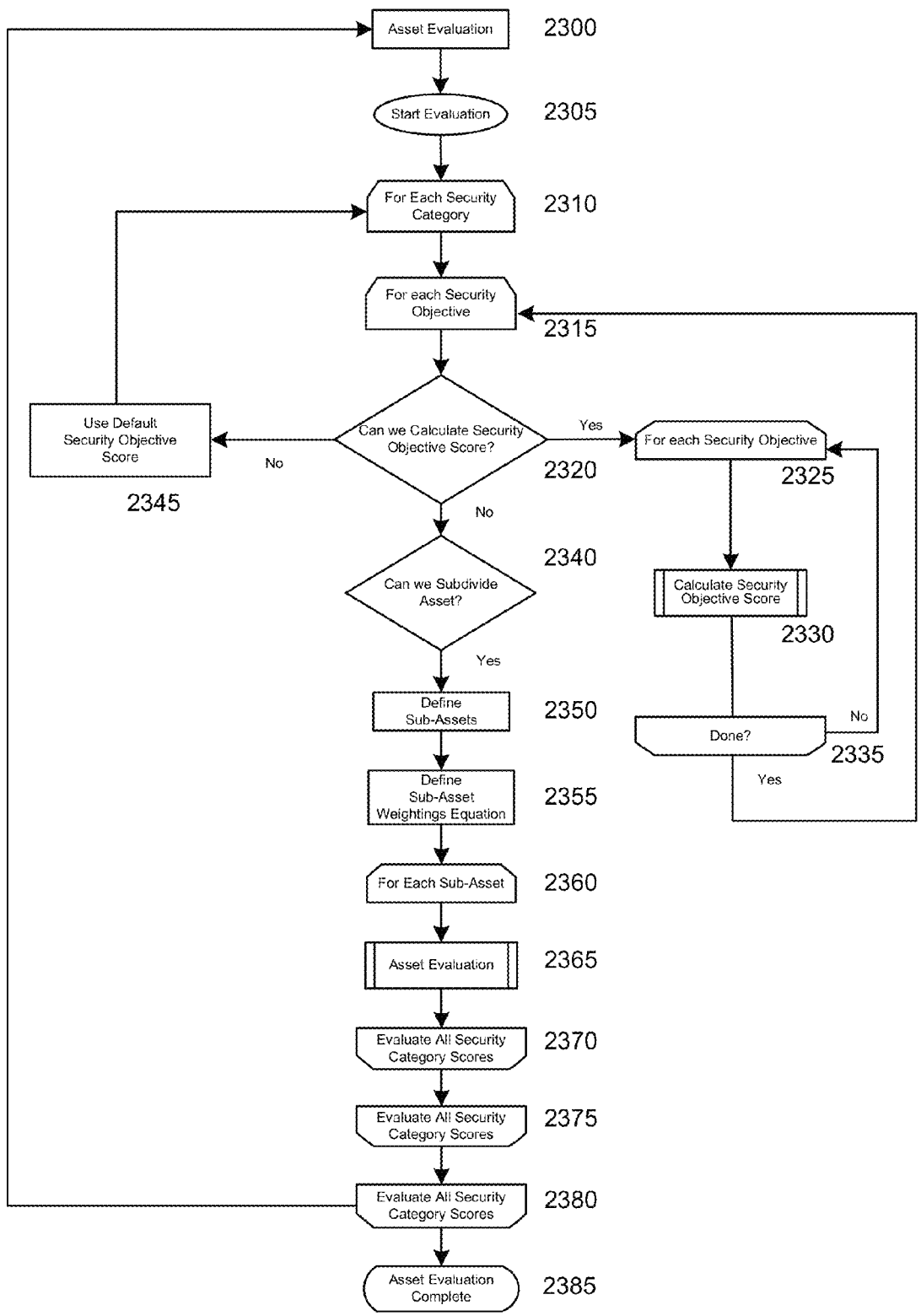
FIG. 19 is an asset evaluation according to an embodiment of the invention.

FIG. 19 is an asset evaluation 2300 flow diagram according to an embodiment of the invention. Some assets may be complex (e.g., made up of many subcomponents). For these complex assets, a measuring technique such as the technique 2300 of FIG. 19 may be conducted on each subcomponent independently to derive an NSS value for each subcomponent. These subcomponent values may be combined to produce the highest order asset's NSS. An asset may be chosen for evaluation, and evaluation may begin 2305. One or more security categories 2220 may be identified, and each security category 2220 may be evaluated 2310. Each security category 2220 may include one or more security objectives 2210, and each security objective 2210 may be evaluated 2315. The security module 2100 may determine whether a security objective score can be calculated 2320 for the security objective 2210. If so, the security objective score calculation may begin 2325, and its security objective score may be generated 2330. Examples of security objective score calculations are discussed in greater detail below. When the score has been calculated 2335, the next security objective 2210 may be selected 2315. If a security objective score cannot be calculated 2320 for the security objective 2210, the security module 2100 may determine whether the asset should be subdivided 2340. Some assets may be too complex to derive the security objective scores directly, or may comprise components, devices, and/or systems that have been previously evaluated. To accommodate these situations, assets may be sub-divided.

Figure 20:
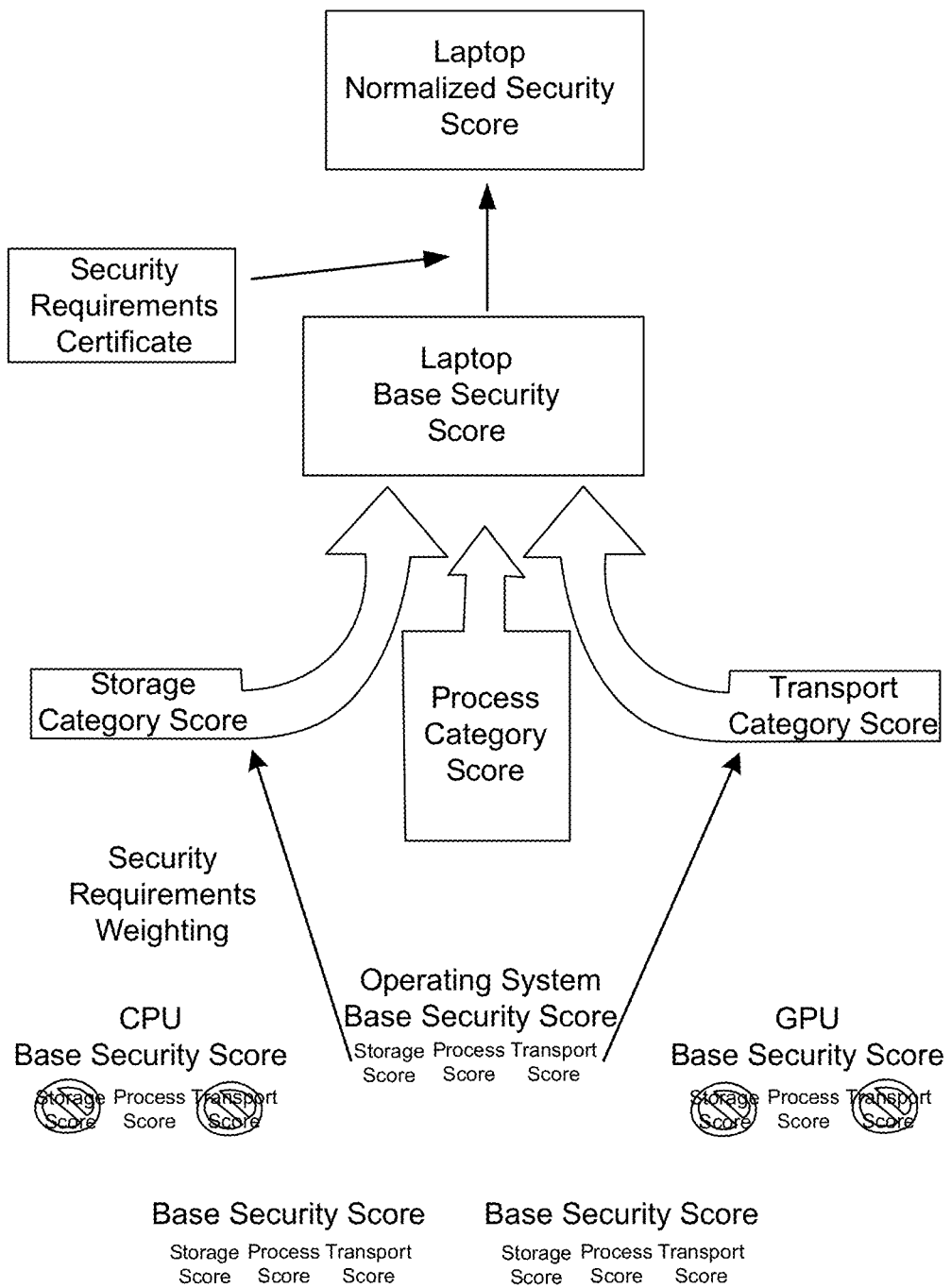
FIGS. 20-23 are asset subdivisions according to embodiments of the invention.
Figure 21:
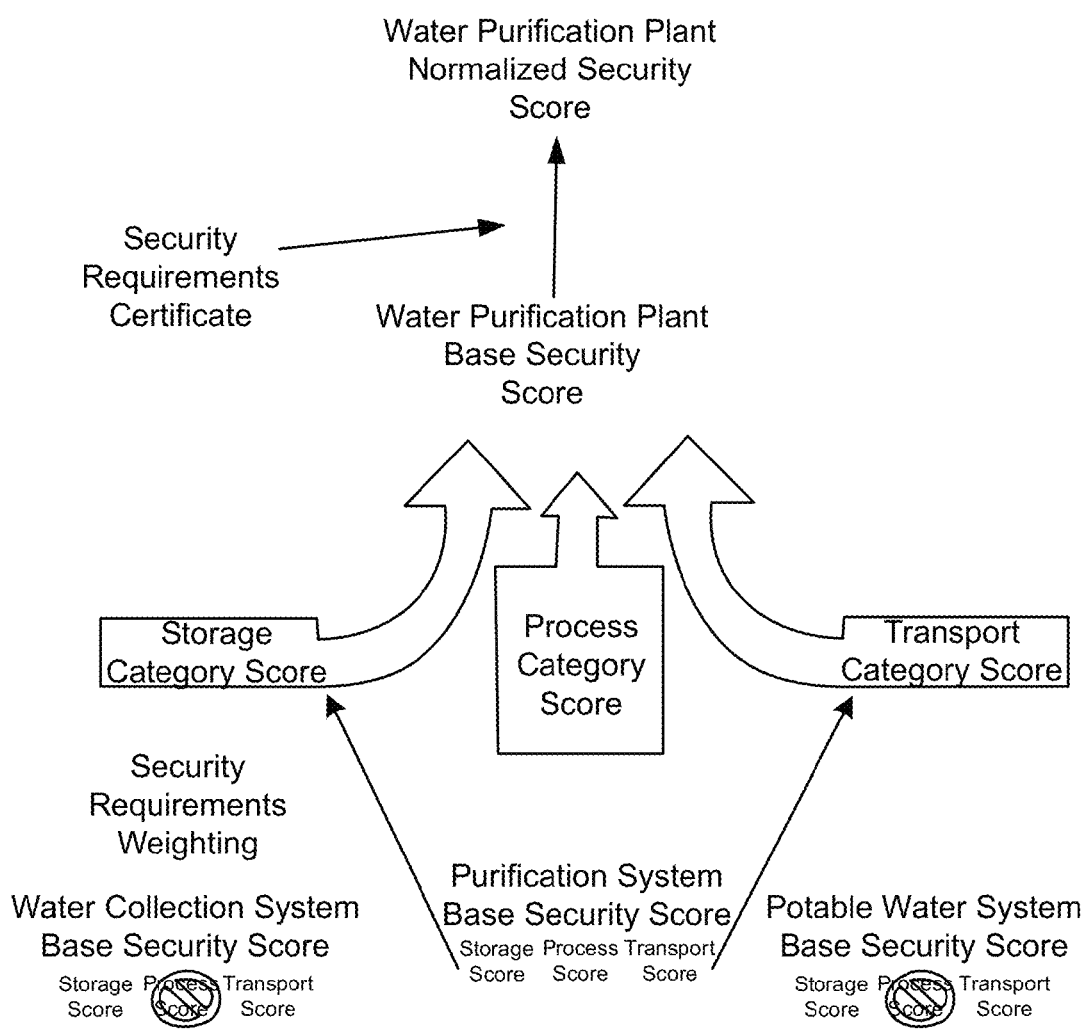
Figure 22:
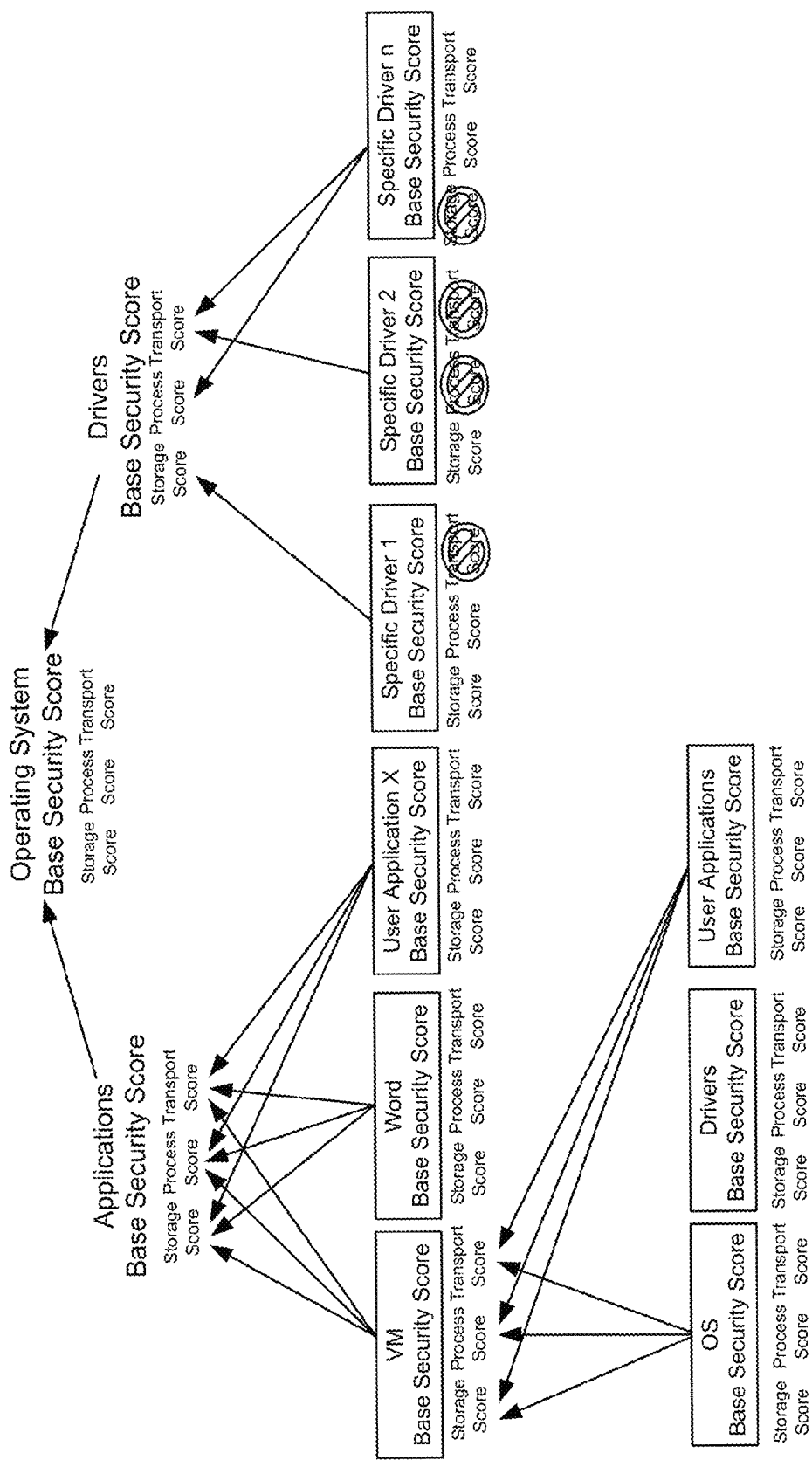
Figure 23:
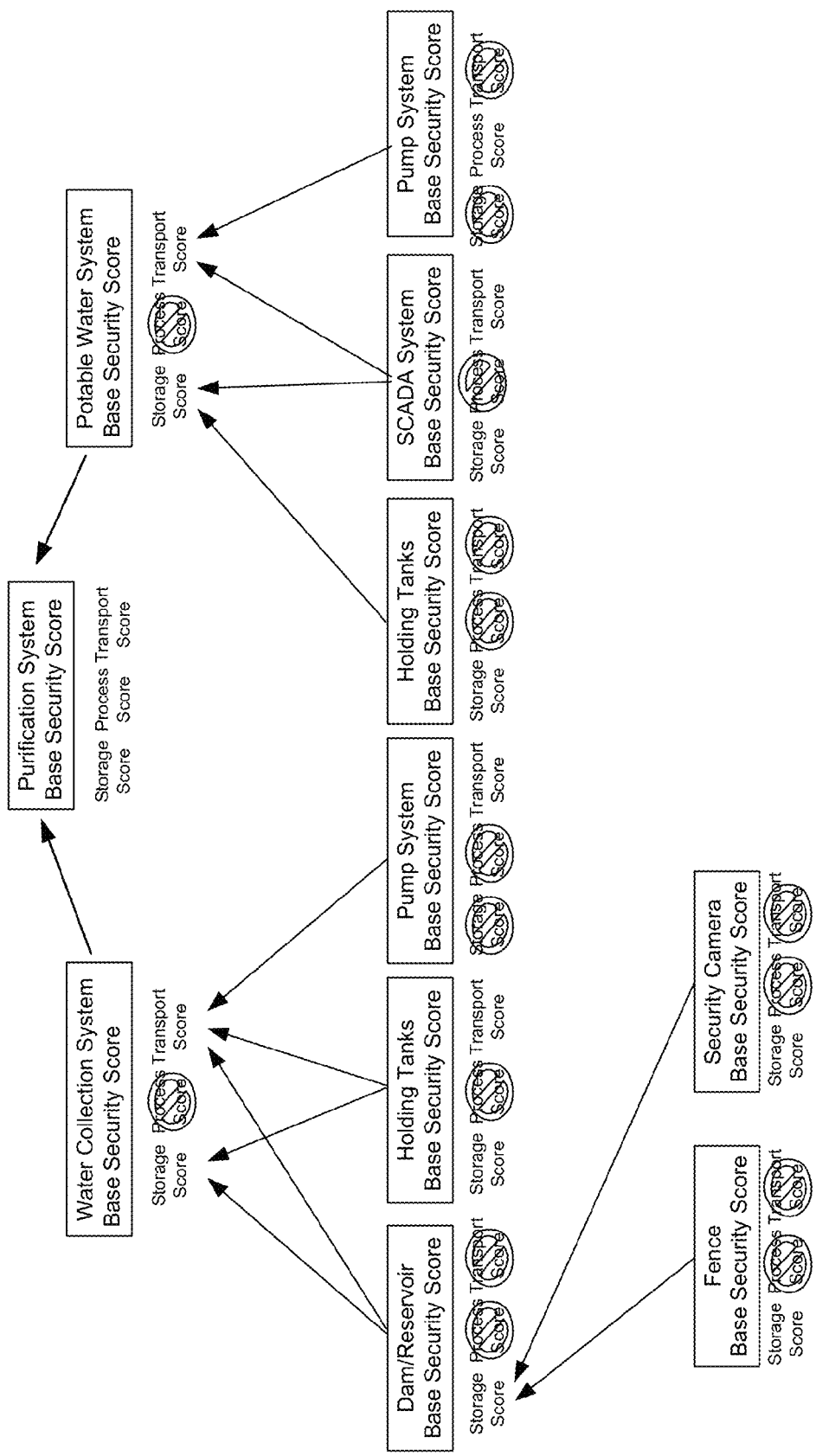

FIGS. 20-23 are asset subdivision examples 3200 and 3250 according to embodiments of the invention. FIG. 20 depicts this principle using a laptop as an example, wherein the laptop is divided into CPU, operating system, and GPU components. FIG. 21 depicts a water purification plant as another example, wherein the plant is divided into water collection system, purification system, and potable water system components. As shown, it may be possible for some sub-assets to only contribute to a single security category score, while others may contribute to multiple security categories. FIG. 22 shows how the laptop sub-assets from FIG. 20 may be broken down further into specific drivers under the drivers sub-asset and specific applications under the application sub-asset. In the illustration, the Virtual Machine (VM) sub-asset of the applications sub-asset is further broken down to the applications running under the VM. This process may be repeated as necessary until every sub-asset may be accurately evaluated. FIG. 23 shows the further breakdown of the water purification sub-assets of the pre-purification sub-asset from FIG. 21, demonstrating that QSM may be applicable to any critical infrastructure component or asset requiring evaluation regardless of the type of asset. A knowledgeable person in the area to which the asset belongs may follow this methodology and recursively break any complex system down to further sub-assets until the system consists of primitives (sub-assets to which an evaluation can or has been performed). In the water plant example these may be sub-assets like fences, guards, and locks whose impact on physical security may be well documented and may be quantified.

Referring back to FIG. 19, if no subdivision is possible, a default security objective score may be assigned 2345, and the evaluation 2300 may move on to the next security objective 2315.

If subdivision is to be done 2340, the security module 2100 may define sub-assets 2350 and sub-asset weightings equations 2355. As noted above, sub-assets may be further divided themselves, in which case analysis may be performed on the further divided sub-assets. For each sub-asset 2360, an asset evaluation 2365 may be performed, and a security objective score 2370 may be generated. All security objective scores may be evaluated 2375, and security category scores may be evaluated 2380. If there are more security categories 2220 to evaluate, the next security category 2220 may be selected 2310, and the evaluation described above may be performed for the security objectives 2210 of the next security category 2220. When all security categories 2220 have been evaluated, the asset evaluation may end 2385. For the asset 2230 of FIG. 18, with three security categories 2220 each having six security objectives 2210, a total of eighteen evaluations may be performed.

Figure 25:
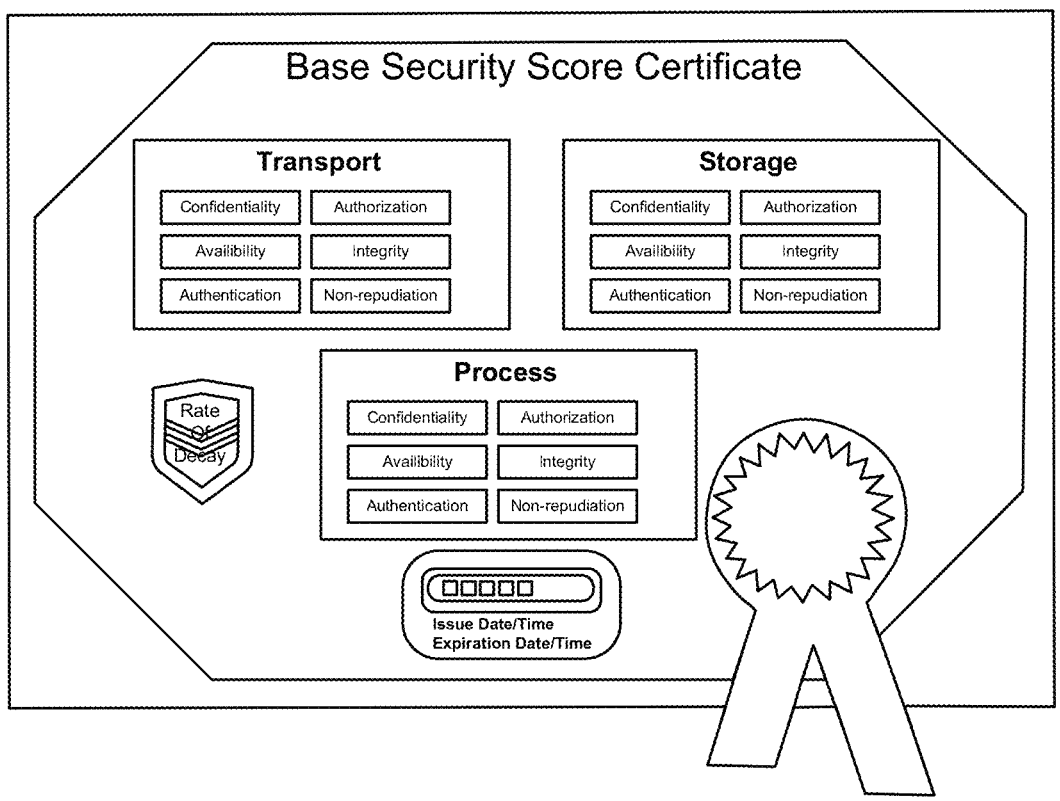
FIG. 25 is a base security score certificate according to an embodiment of the invention.

Utilizing NSS, objective score sets, and derived security rules along with cryptographic techniques such as public-private key certificates, digital assets may securely store their security level along with the time the evaluation of the asset was performed in a Base Security Score Certificate (BSSC). FIG. 24 is a BSSC 2700 according to an embodiment of the invention. The BSSC 2700 may include scores for each security objective 2210 and category 2220. For the example asset 2230 of FIG. 18, the BSSC 700 may be a 3-tuple of security category 2220 scores (SCS), each of which may in turn be a 6-tuple of security objective 2210 scores. FIG. 25 is an example BSSC 2700 for the asset 2230 of FIG. 18. This example BSSC 2700 may have a base security score (BSS) expressed as BSS=((Transport SCS), (Storage SCS), (Process SCS)) or BSS=(($T_C$, $T_I$, $T_{AZ}$, $T_{AI}$, $T_{AV}$, $T_{NR}$), ($S_C$, $S_I$, $S_{AZ}$, $S_{AI}$, $S_{AV}$, $S_{NR}$), ($P_C$, $P_I$, $P_{AZ}$, $P_{AI}$, $P_{AV}$, $P_{NR}$)), where C=confidentiality, I=integrity, AZ=authorization, AI=authentication, AV=availability, and NR=non-repudiation. The BSSC 2700 may be signed by an individual, corporation, regulatory agency, or government agency, for example. The BSSC 2700 may include a date/time the certificate was issued and a date/time the certificate will expire. The BSSC 2700 may also include a rate of decay for the NSS, which is described in greater detail below.

To take into account the transient nature of security, meaning security may have a high probability of degrading post measurement, a security rate of decay (ROD) algorithm may be used to factor in probabilistic security degradation that has occurred since the last NSS evaluation noted in the BSSC was conducted. The ROD may be used to determine a realistic security score for a system given the time that has passed since a BSSC was initially issued. The algorithm for calculating the ROD may be dependent upon the metrics chosen for scoring the system. By using the NSS and objective score sets as inputs along with the time of the last evaluation (and optionally other security rules or recorded asset usage history), a new NSS score may be calculated and used for more accurate common security comparisons.

The Security Objective Score may provide a probabilistic based evaluation determined by computing security metrics which may describe the probability of a compromise. This probabilistic equation may be expressed as SOS=P(Compromise|Security Measures≠Threats). The SOS is the probabilistic likelihood of a compromise of the asset due to the implemented security measures not safeguarding against threats, where threats are a probabilistic expression over time that an actor with a given motivation may utilize an exploit. Threats=P(Time|Actor|Motivation|Exploit).

Time may be pulled out and carried in the BSSC, represented as the ROD, to allow the SOS to be a set of values. The ROD may indicate how sensitive the SOS is to time exposure. A higher ROD may indicate that the threat against the asset increases more over time than a ROD that is lower.

For example, a NSS may have a range of 0 to 10, with zero being no security and 10 being completely secure. If a given asset has a shelf life (or time until a patch or update is required) of 770 days and no other factors contribute to reducing or extending this shelf life, one way of calculating the ROD may be by taking the maximum NSS value of 10 and dividing it by 770 days. ROD=10 (Max NSS value)/(days until 100% likelihood of compromise)=10/770=0.013/day. By reducing the calculated NSS by the ROD times the change in time (days), regardless of the security of the system, at the end of the 770 days the score would be zero. In other words, the system may be regarded as unsecure without some action. In practice, there may be some minimal value somewhere above zero at which the system may be considered unsecure, and this value may be represented as the minimum NSS in the SRC.

Another example may involve an ammo bunker at a military installation. The vault door on the bunker may contribute to one component ("$S_1$") of security. Let the vault be rated at a 6 hour penetration level and let the vendor testing indicate a 60% penetration rate for a skilled attacker with unrestricted access after the 6 hour time period increasing by 5% every hour thereafter. Thus, $S_1$ is 0.95 with a ROD step at 6 hours to 0.6 and a steady 0.05 decay per hour after that. With this clearly spelled out in the vault's BSS, the commander may order a guard to roam past the bunker every 3 hours (essentially resetting the ROD for the door). These two factors together may contribute a $S_1$ for the door of a consistent 0.95.

Figure 26:
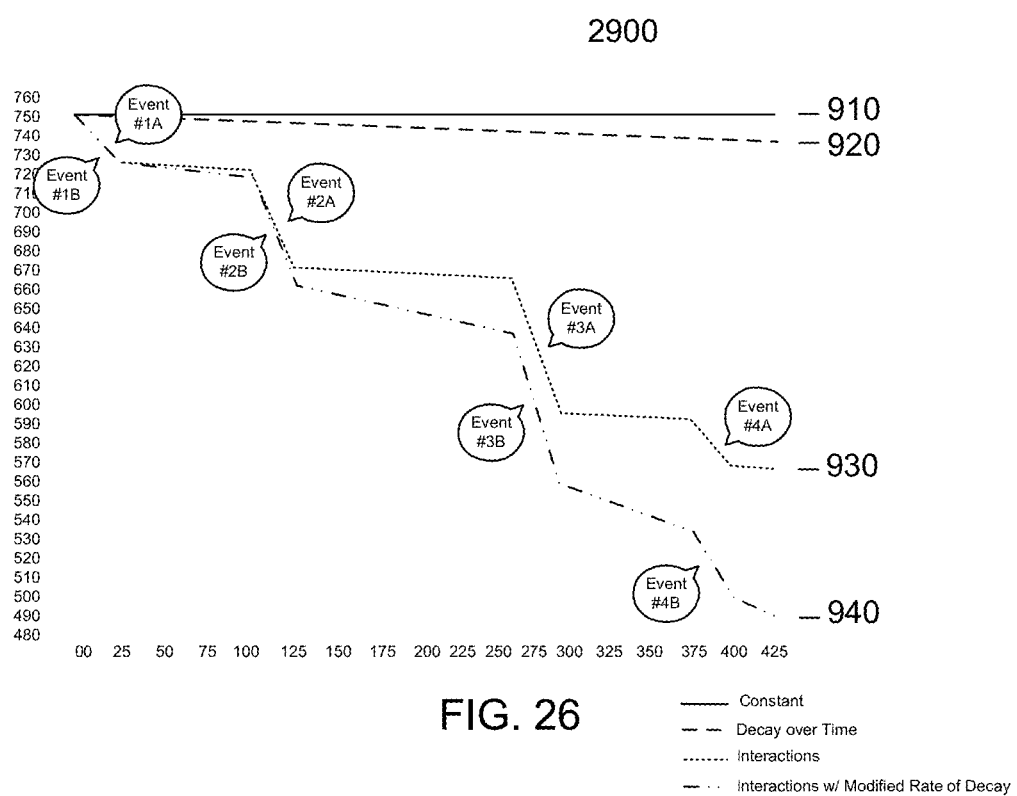
FIG. 26 is a security score degradation according to an embodiment of the invention.

FIG. 26 is a security score degradation 900 according to an embodiment of the invention. Line 910 shows a security for a system without a ROD value which remains constant over time. However, the longer a system runs the more likely it may be for the system to become compromised. This decrease in security is shown by line 920, which shows a linear ROD of 0.01 per unit of time. Lines 930 and 940 show the security of a system over time while taking into account events, which may negatively impact the security of the system. Line 930 represents four security events which decrease the security of the system but do not cause a change in the ROD. Line 940 depicts the same four events but assumes each of these events also alters the ROD value. The events depicted in FIG. 26 may be the result of connecting a USB device to the system, connecting the system, to an untrusted network, browsing to a malicious website, or installing a downloaded application, for example.

In order to allow assets to maintain a history of significant events, the QSM may support the concept of certificate chains, or Security Score Chain (SSC). The BSSC may provide a base certificate in any SSC. The asset can modify the score and sign a new certificate with the BSSC, thereby creating the SSC. When creating an SSC, the asset may include a record of why the modification is being made. In FIG. 26, after each event on line 930 or 940, an update to the SSC may be made reflecting the change to the ROD and documenting the events that caused these changes. If the BSSC is given a ROD, the new security score may adjust for any decay (e.g., as shown in line 940) since the new certificate in the chain will have a new issue date/time. The expiration date/time may not be extended past the expiration of the BSSC, but may be shortened if appropriate. In addition, if appropriate, the ROD may be modified to reflect new risks and threats.

Figure 27:
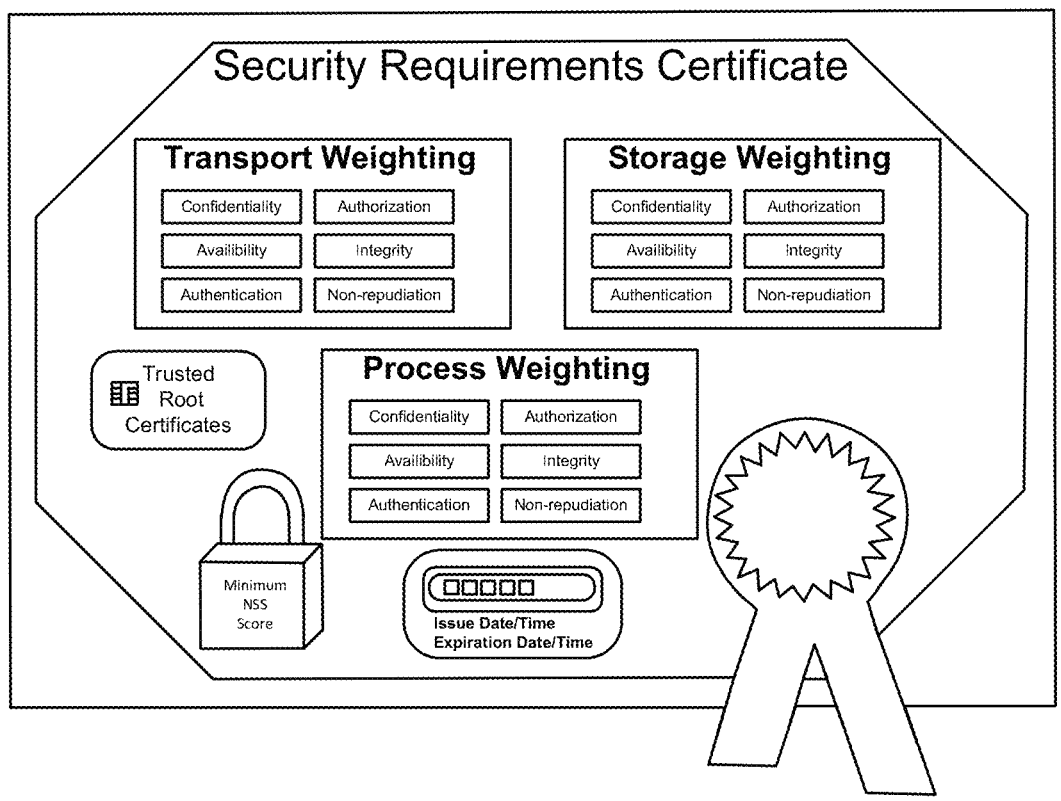
FIG. 27 is a security requirements certificate according to an embodiment of the invention.

FIG. 27 is a security requirements certificate (SRC) 3400 according to an embodiment of the invention. The SRC, like a BSSC, may be a cryptographically secured, signed document containing security requirement weightings (SRW) for each of the security objective 2210 scores (SOS), the security weightings for each of the security objectives 2210, the authorized BSSC and SSC signatories, and/or a minimum Normalized Security Score (NSS).

The SRC may specify which signatories are recognized and accepted by a resource when evaluating the BSSC of an asset looking to gain access to the resource. This may protect the resource against an attempt to falsify security scores by generating a BSSC signed by an unauthorized signatory. In addition, the ability to specify trusted signatories may allow for variation in the security metrics used and the evaluation scale for NSS. For example, security metrics may be based on the Sandia RAM series evaluations and the specification of such may allow a conversion from the Sandia RAM series evaluations to the NSS in a range from 0-100. Likewise, another embodiment may use the CARVER methodology or some pair-wise comparison evaluation and may use a QSM 0-10 scale. Similarly, an embodiment can utilize proprietary metrics and a scale of 0.00 to 1.00. Any and all of the above combinations may be utilized in the evaluation of a complex system, the NSS and QSM methodology may allow for their inclusion. QSM may take known shortcomings in methodologies into account by increasing the rate of decay and reducing the NSS due to the uncertainty of the metrics. Thus, existing systems and evaluations may be leveraged in the short term until a valid QSM evaluation may be performed.

Enhanced authentication and authorization processes between assets may take advantage of the common security measuring and comparison methods described above. This may be done by forcing a real-time evaluation to derive the NSS and objective score set of an asset or utilizing the information stored in BSSC from a past evaluation as well as optionally using the rate-of-decay algorithm of an asset. Additional security rules such as the ones stored in BSSC may also be used as authentication or authorization security criteria. The security level validation may be conducted one-way for one of the assets engaged in the authentication or authorization process, as shown in the example security verifications described above. In some embodiments two-way validation (or all-way validation when two or more assets are trying to authenticate or authorize each other) may be performed, wherein each asset validates the security level of the other.

The NSS may be the highest-level score in the QSM and may be calculated by applying the security requirement weightings in the security requirements certificate to the security objective scores in the base security score. Mathematically, the SRW may be similar to the BSSC (e.g., a 3-tuple of Security Category Weightings (SCW) (which may be the percentage weighting each of the categories contribute to the NSS), with each SCW being a 6-tuple value of security objective weightings (SOW) (which is the percentage weighting attributed to each of the SOS values). For example, an SRW may can be represented as: SRW=(Transport SCW(Transport SOW), Storage SCW(Storage SOW), Process SCW(Process SOW)) or SRW=(SCW($T_C$, $T_I$, $T_{AZ}$, $T_{AI}$, $T_{AV}$, $T_{NR}$), SCW($S_C$, $S_I$, $S_{AZ}$, $S_{AI}$, $S_{AV}$, $S_{NR}$), SCW($P_C$, $P_I$, $P_{AZ}$, $P_{AI}$, $P_{AV}$, $P_{NR}$)), for the example of FIGS. 18 and 25.

The NSS may provide a metric that can be used to evaluate the security posture of a given asset over time ($\Delta T$). This score may be used to authenticate the asset, authorize access, compare the security utility of assets, or determine where improvements should be made to a given asset, for example. A NSS may be calculated as follows: NSS=(BSS*SRW)−(ROD*$\Delta T$). Thus, a NSS for the example of FIGS. 3 and 7 may be NSS=(SCW$_T$*($T_C$*TW$_C$+$T_I$*TW$_I$+$T_{AZ}$*TW$_{AZ}$+$T_{AI}$*TW$_{AI}$+$T_{AV}$*TW$_{AV}$+$T_{NR}$*TW$_{NR}$)+SCW$_S$*($S_C$*SW$_C$+$S_I$*SW$_I$+$S_{AZ}$*SW$_{AZ}$+$S_{AI}$*SW$_{AI}$+$S_{AV}$*SW$_{AV}$+$S_{NR}$*SW$_{NR}$)+SCW$_P$*($P_C$*PW$_C$+$P_I$*PW$_I$+$P_{AZ}$*PW$_{AZ}$+$P_{AI}$*PW$_{AI}$+$P_{AV}$*PW$_{AV}$+$P_{NR}$*PW$_{NR}$))−(ROD*($T_{CURRENT}$−$T_{ISSUED}$))

Figure 28:
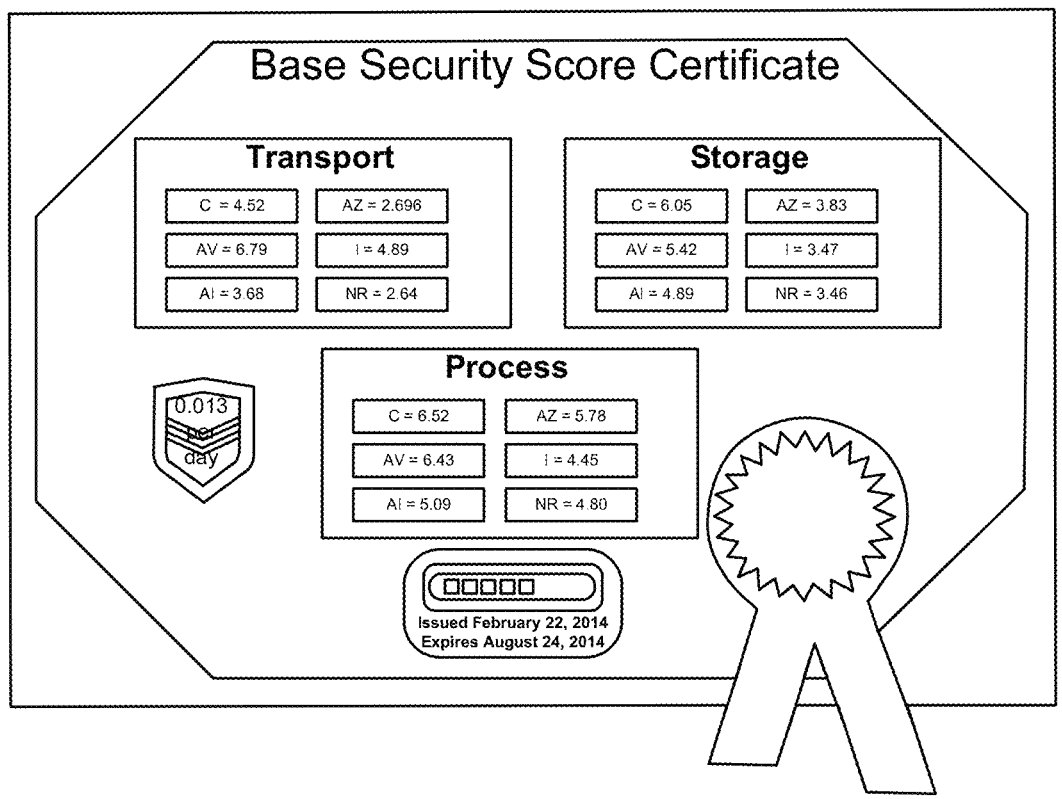
FIG. 28 is an example base security score certificate according to an embodiment of the invention.

FIG. 28 is a base security score certificate 3500 according to an embodiment of the invention. In this example, BSS=((6.05, 3.47, 3.83, 4.89, 5.42, 3.46), (6.52, 4.45, 5.78, 5.09, 6.43, 4.80), (4.52, 4.89, 2.69, 3.68, 6.79, 2.64)). The ROD is 0.013/day, and the certificate was issued on 22 Feb. 2014 and has an expiration of 24 Aug. 2014.

Figure 29:
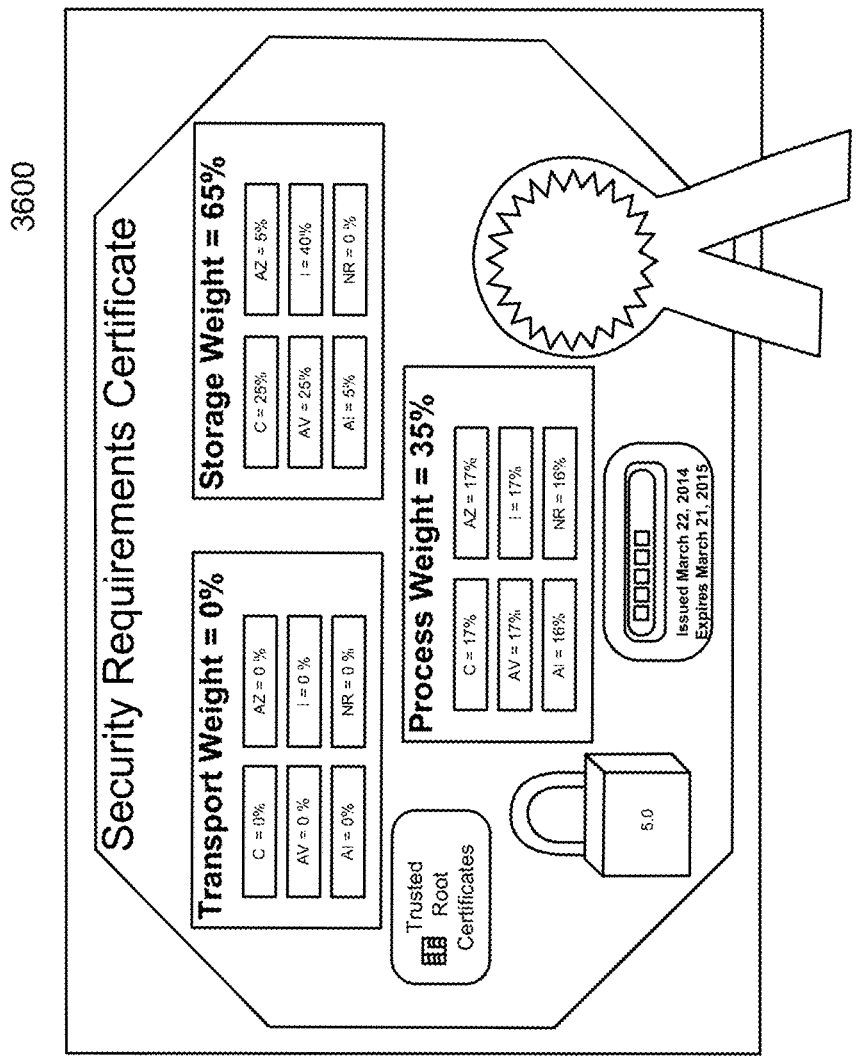
FIG. 29 is an example security requirements certificate according to an embodiment.

FIG. 29 is a security requirements certificate 3600 according to an embodiment of the invention. In this example, SRW=(0% (0%, 0%, 0%, 0%, 0%, 0%), 65% (25%, 40%, 5%, 5%, 25%, 0%), 35% (17%, 17%, 17%, 16%, 17%, 16%)). The 0.0 weighting in the transport security objective weighting shows that this particular asset owner does not care about or does not utilize transport activities. Such a scenario may exist for a stand-alone machine or a smartcard, which may not have any means of transporting data but does have storage and processing capabilities. The minimum required NSS listed in the SRC is 5.0 and the issue date or TCURRENT=22 Mar. 2014. Below is the detailed calculation of the storage portion; the other detailed calculations are omitted:

Storage portion=0.65*(0.25*6.05+0.4*3.47+ 0.05*3.83+0.05*4.89+0.25*5.42+0.0*3.46)=3.05

NSS=(0+3.05+1.93)−(0.013*(23Mar.2014− 22Feb.2014)=(4.98−(0.013*29))=4.6

This computed NSS may be compared against the stored min NSS value, if it is above the min NSS value, it may be approved. In the above example, since the calculated NSS of 4.6 is less than the SRC permits (5.0), the device would be rejected.

Figure 30:
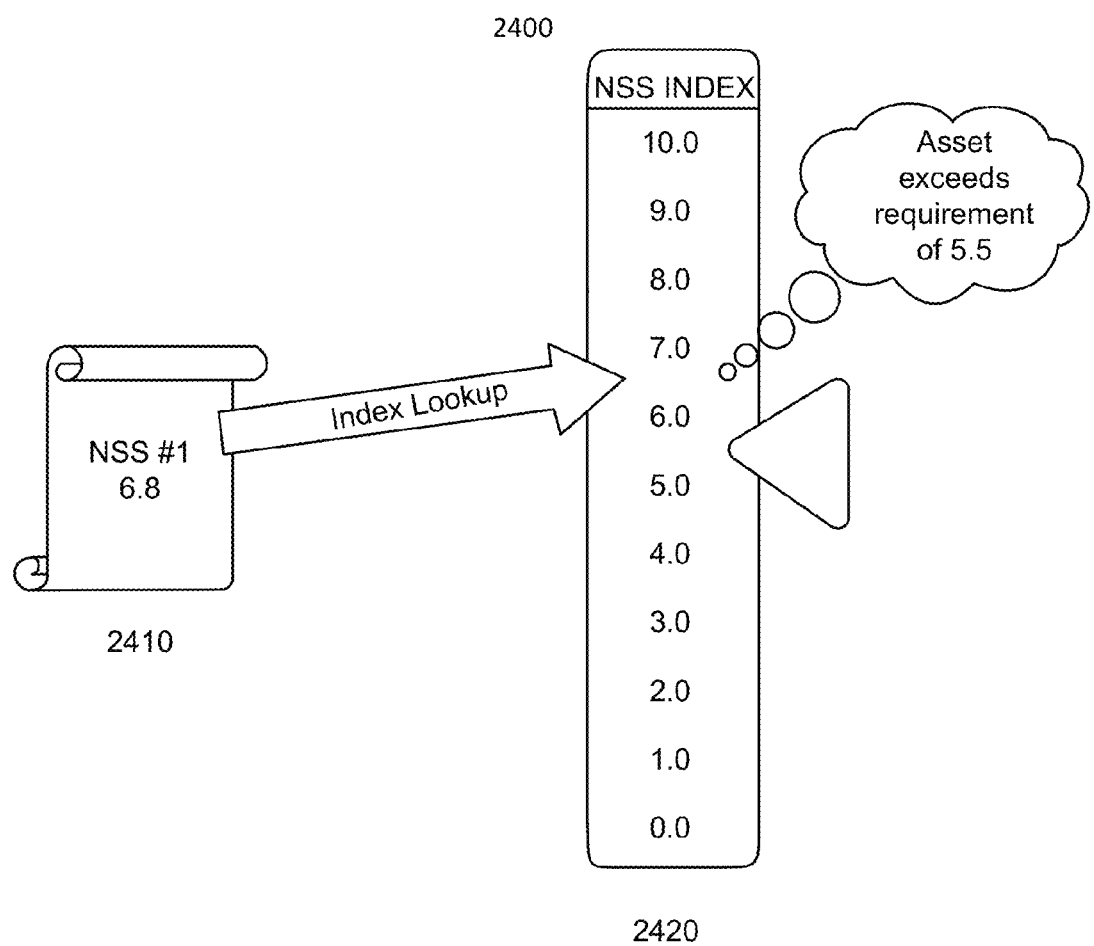
FIG. 30 is a normalized security score comparison according to an embodiment of the invention.
Figure 31:
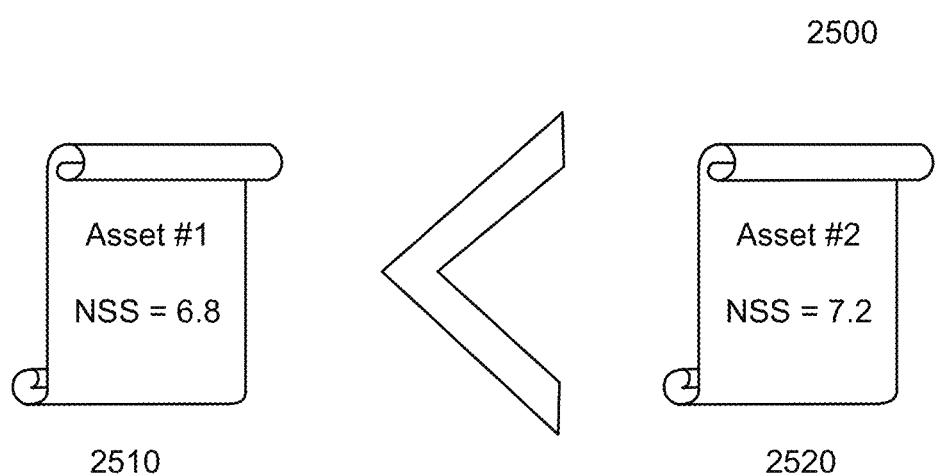
FIG. 31 is a normalized security score comparison according to an embodiment of the invention.

The NSS values may be compared and contrasted allowing a security level index to be applied to the security of an asset. FIG. 30 is an NSS comparison 2400 according to an embodiment of the invention. An NSS value 2410 may be compared to an NSS index 2420 to determine whether the NSS for an asset indicates that the asset has a minimum required security level. For example, the NSS index 2420 may indicate that an asset with a score of 5.5 or more has an acceptable security level, and an asset with a score less than 5.5. does not have an acceptable security level. In the example of FIG. 30, the asset has an NSS of 6.8 and thus exceeds the requirement of 5.5. Additionally, two or more assets may be compared to determine if they have the same or contrasting security levels, or to determine which of the assets are more secure. FIG. 31 is an NSS comparison 2500 according to an embodiment of the invention. In this example, asset 1 has an NSS value 2510 of 6.8, and asset 2 has an NSS value 2520 of 7.2, so asset 2 may be regarded as more secure than asset 1. Based on agreed upon pre-determined security objectives and categories along with the pre-determined score aggregation processes and common security measure methods, transitivity may suggest that the security comparison is an agreed upon, reproducible, independently verifiable security comparison.

Figure 32:
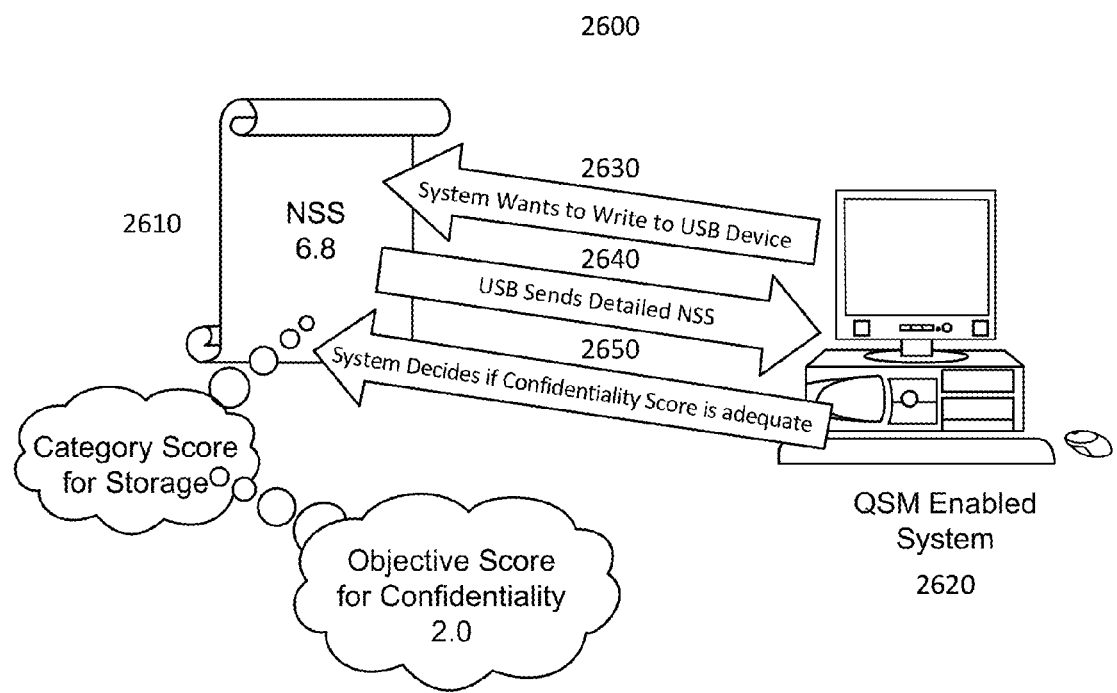
FIG. 32 is a security verification according to an embodiment of the invention.

Utilizing the NSS and the objective score set, extended security comparisons may be conducted that may commonly measure more specific security attributes of an asset. FIG. 32 is a security verification 2600 according to an embodiment of the invention. An asset 2610 (e.g., a USB device) may have a calculated NSS (e.g., 6.8). a QSM enabled system 2620 may verify asset security 2600 before interacting with the asset. The system 2620 may be asked to perform an operation using the asset (e.g., a write operation to the USB device) 2630, for example via user input. The asset 2610 may send its NSS 2640 to the system 2620. The system 2620 may evaluate the NSS (e.g., by performing a comparison as shown in FIG. 30). If the NSS evaluation indicates adequate security, the operation may proceed. If not, the operation may be prevented.

Figure 33:
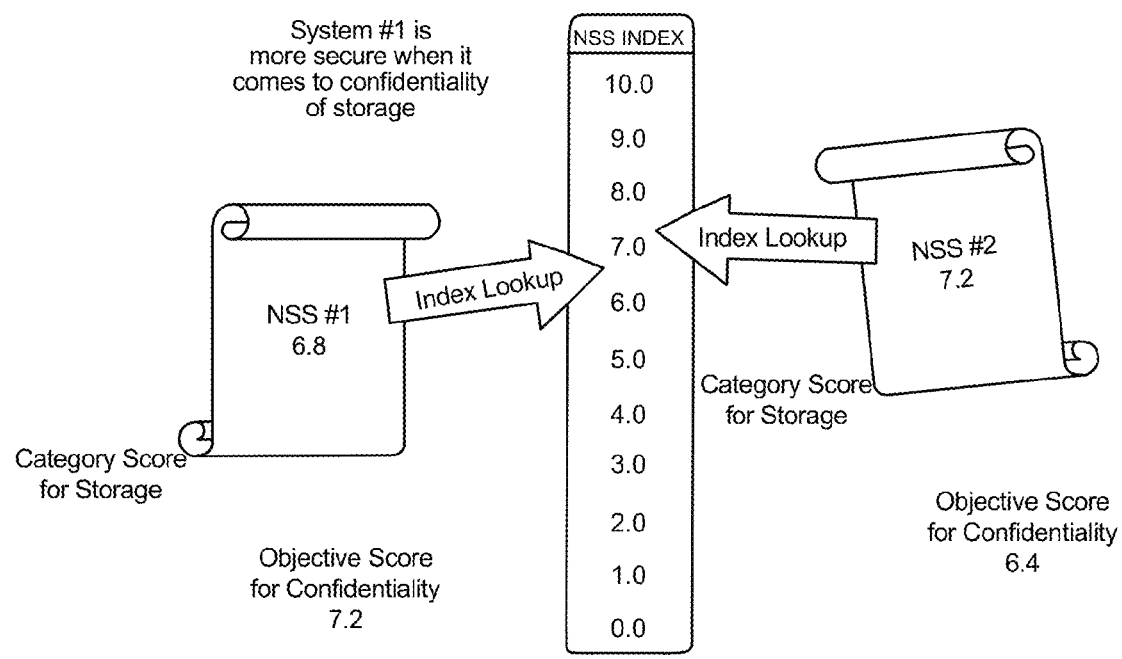
FIG. 33 is a security comparison according to an embodiment of the invention.

In the example of FIG. 33, is a security comparison 2100 according to an embodiment of the invention, wherein two different systems are being compared. System #1 has a lower NSS score than system #2, but system #1 has a higher category score for confidentiality of storage than system #2. Comparisons such as these may be used to determine which product to buy (e.g., which product best meets a user's security needs), or to determine which systems should be upgraded first, or to inform other decisions about system security.

Figure 34:
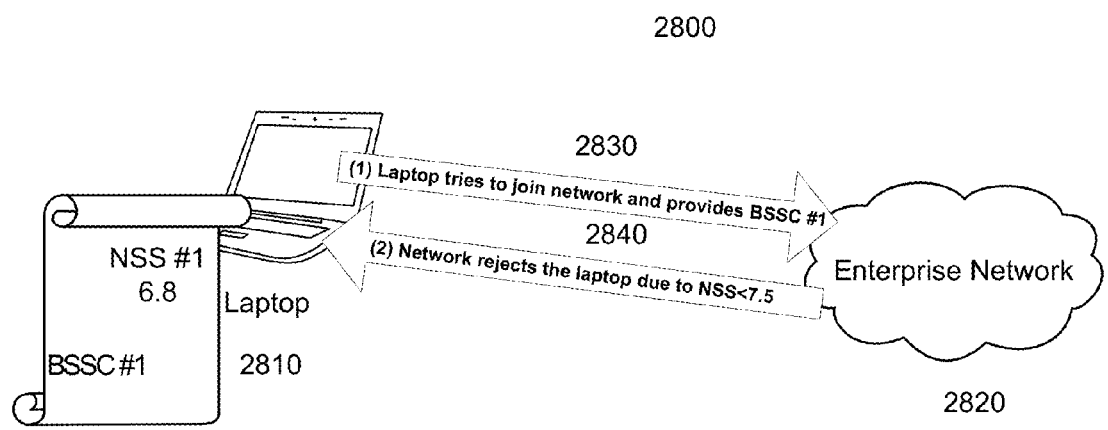
FIG. 34 is a network access verification according to an embodiment of the invention.

FIG. 34 is a security verification 2800 according to an embodiment of the invention, wherein a BSSC of an asset (laptop 2810) may be used for interaction with an enterprise network 2820. The asset 2810 may attempt to join the network 2820 and may provide the BSSC 2830. The network 2820 may evaluate the BSSC and decide whether the asset 2810 is secure 2840. In this example, the asset 2810 has an NSS in its BSSC that is below a threshold required by the network 2820, so the network 2820 denies access to the asset 2810.

Figure 35:
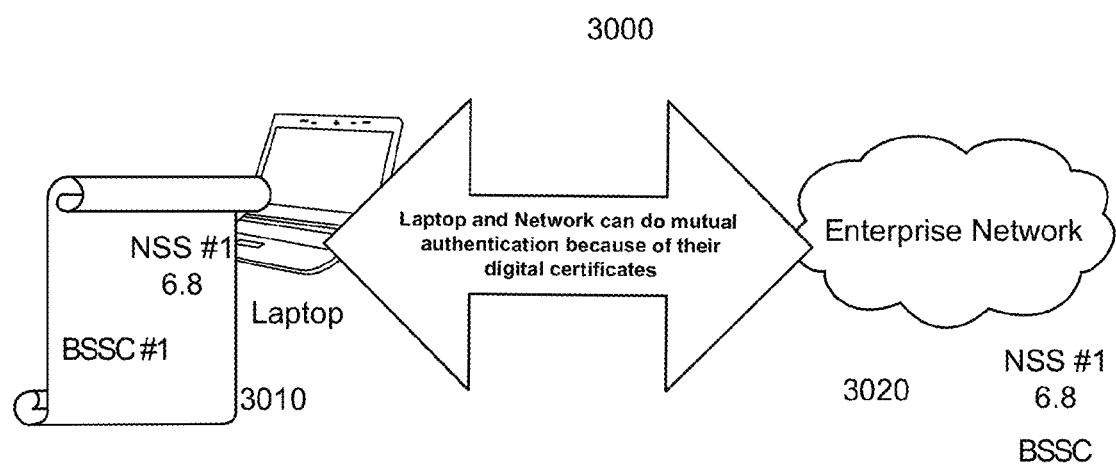
FIG. 35 is a mutual security verification according to an embodiment of the invention.

FIG. 35 is a mutual security verification 3000 according to an embodiment of the invention. In this example, the laptop 3010 may validate the BSSC of the enterprise network 3020, and the enterprise network 3020 may validate the BSSC of the laptop 3010, and each asset may separately decide whether the other has a high enough security to permit interaction.

In some embodiments, a security rule enforcement during the verification process may prompt a reevaluation of one or more of the assets participating in an authentication or authorization.

Figure 36:
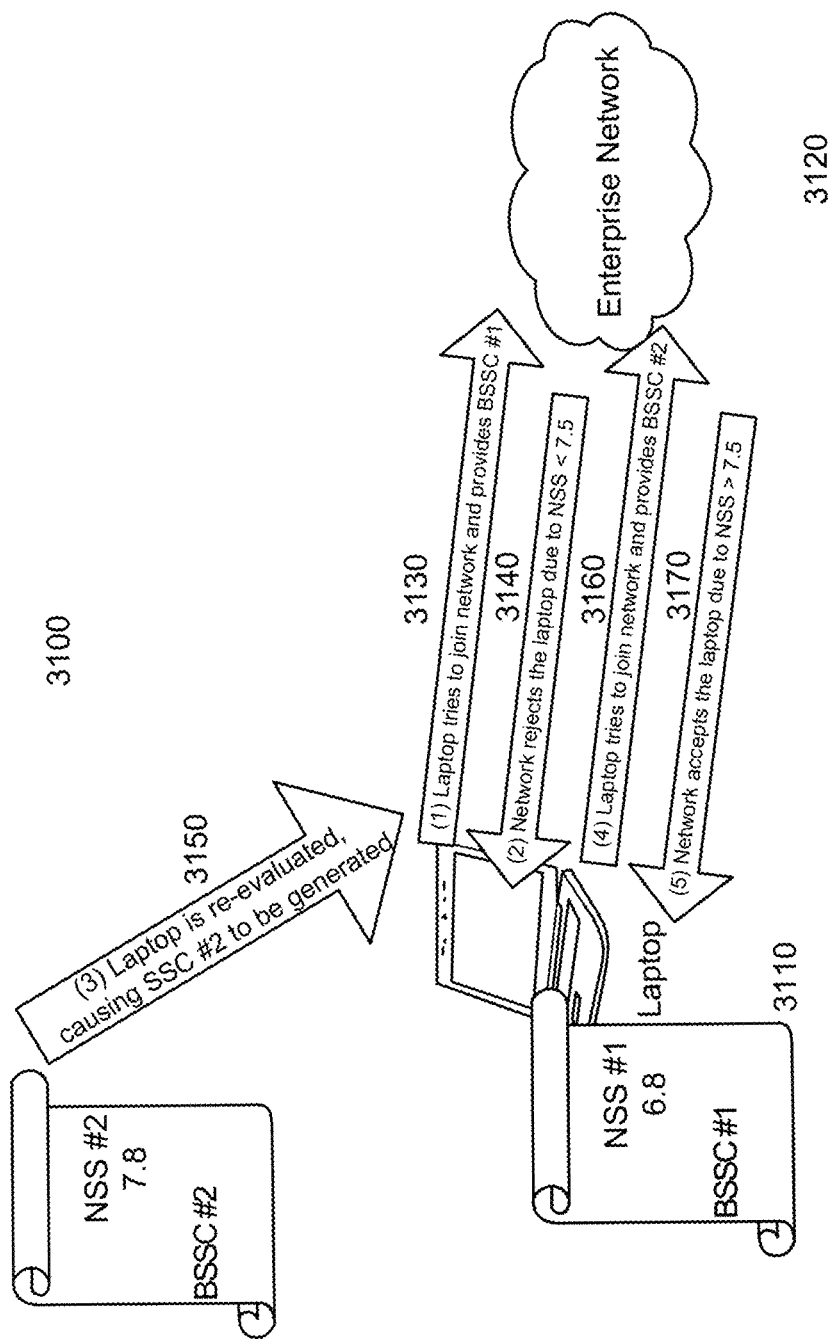
FIG. 36 is a network access verification with re-evaluation according to an embodiment of the invention.

FIG. 36 is a security verification 3100 according to an embodiment of the invention. A BSSC of an asset (laptop 3110) may be used for interaction with an enterprise network 3120. The asset 3110 may attempt to join the network 3120 and may provide its BSSC 3130. The network 3120 may evaluate the BSSC and decide that the asset 3110 is not secure 3140. In this example, the asset 3110 has an NSS in its BSSC that is below a threshold required by the network 3120, so the network 3120 denies access to the asset 3110. The asset 3110 may be reevaluated by the security module 2100 in response 3150. As noted above, NSS values may degrade over time. Furthermore, new security features may be implemented on an asset over time. Thus, the reevaluation 3150 may generate a new NSS value for the updated BSSC. In this example, the new value indicates that the asset 3110 is secure enough to interact with the network 3120. The asset 3110 may make a second attempt to join the network 3120 and may provide its updated BSSC 3160. The network 3120 may evaluate the BSSC and decide that the asset 3110 is secure 3170.

QSM evaluation of devices with built-in processing power, such as servers, PCs, and routers may be performed automatically. This may be accomplished by running a QSM process that utilizes a combination of backend databases, scans of configuration information on the computer, and/or automated penetration-testing tools to generate a NSS. This may allow a service provider or network to require at least a minimal security posture for devices that wish to connect to their services that may not have undergone a full QSM evaluation.

This automation may be taken a step further to preemptively protect QSM devices. If a new exploit or other threat is identified, a backend database may search for registered devices that are susceptible and take preemptive action. This action may be to lower their NSS, revoke their cert, and/or advise the asset owner that they should disable a particular service or install a patch or update or advise the system administrator of the threat, for example. Due to the nature of many computer networks, these preemptive services may require periodic communication between the devices and the backend services in some embodiments.

Automated evaluation and certificate generation may also allow for real-time evaluations to be performed for access to systems that may have a particularly high security requirement where a certificate that is even a few days old may not be acceptable, for example. These high security systems may require a certificate that is current (e.g., that day, that week, etc.). This may be handled automatically in some embodiments. An automated QSM evaluation process may allow systems to require reevaluation and recertification at every request to utilize system resources in some embodiments.

The following additional examples illustrate scenarios wherein the QSM may be used for authentication and/or authorization. For the purposes of this section, it may be assumed that devices within the QSM have an SSC. Devices or systems that have their own computing resources may also be assumed to have an SRC. An example of a device which may not have an SRC is a USB memory stick. Since many USB memory sticks do not have their own computing resources, they may be unable to compare their SRC to an SSC they receive, so there may be no reason for them to have an SRC. In addition, the SSC for a device without its own computing resource may simply be the BSSC since the device cannot update the SSC from the BSSC.

Devices using QSM may leverage the SSC in order to perform device authentication and authorize network access. This authentication and authorization may be mutual, allowing for each entity to authenticate and authorize the other, as described above. Utilizing an automated QSM evaluation tool, this mutual authentication may be expanded to external devices that may require temporary or occasional access to network resources, such as joining a Wi-Fi access point at a corporate office, accessing an online merchant, etc. A resource owner may not be able to require a physical assessment of every device that may require occasional access to their resources, where requiring the download or access of a QSM evaluation tool as part of the registration or signup process may be feasible. The QSM tool may then generate an automated BSSC based on an automated scan as discussed above, and then the device may participate in a mutual authentication exchange prior to being granted access to network resources.

Figure 37:
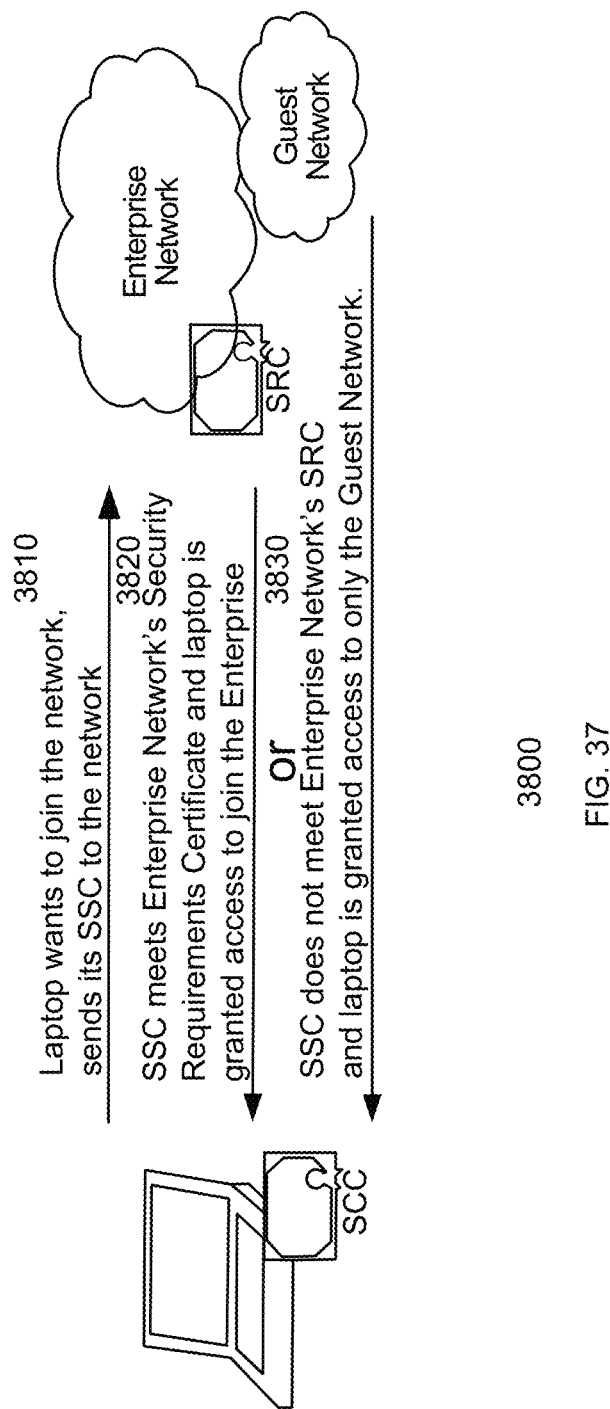
FIG. 37 is a network access verification with fallback network access according to embodiment of the invention.

FIG. 37 is a security verification 3800 according to an embodiment of the invention. Upon connecting to a network, a device can provide the network with its SSC 3810. Since the SSC is a cryptographically signed certificate, the SSC may be unique to the device. As a result, it may be leveraged for authenticating the device (rather than a user) to the network. The network can leverage the SSC for logging purposes to identify any device that may be behaving in a malicious or suspicious manner. A network administrator can leverage the SSC to decide whether or not the device is permitted to join the network based on the device's current security level in some embodiments. Devices meeting the requirements may be allowed to join the network 3820. Besides simply granting or not granting access, the SSC may be leveraged to determine which network segments the device is authorized to access. For example, a device failing to meet an enterprise's security requirements may be placed on a guest network, allowing the device to access the Internet while preventing access to enterprise resources 3830.

Figure 38:
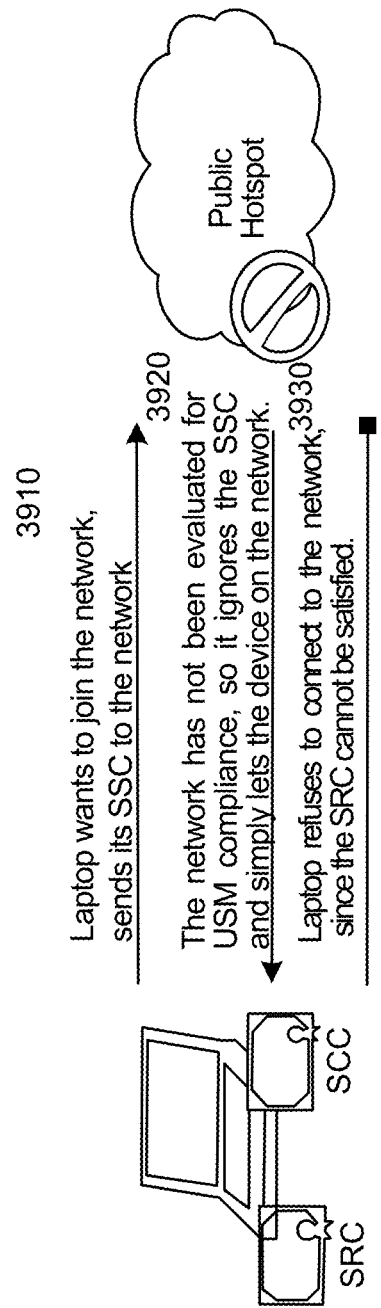
FIG. 38 is client-side network access verification according to an embodiment of the invention.

FIG. 38 is a security verification 3900 according to an embodiment of the invention. Devices can also leverage the SSC in order to authenticate and authorize the network itself. Since networks themselves may have cryptographically signed SSCs, the device may be able to identify the network it is attempting to join. This methodology could eliminate the possibility of network spoofing, whether wired, wireless, or cellular. Users and/or system administrators can leverage the SSC in order to limit which networks the device will use. For instance, an enterprise administrator could configure laptops so they can only connect to the enterprise network, a designated telecommuting router at the employee's house, and a designated cellular network. Employees may be unable to connect their device to any other network. In this example, the laptop may send its SSC to a network 3910. The network may ignore the SSC if it is not evaluated for NSS compliance 3920. In this case, the laptop may refuse to connect to the network, because the SRC is not satisfied 3930.

Furthermore, since the SSC may be updated occasionally, system administrators may permit devices to join less secure networks. The device's SSC may be updated to indicate which insecure network it had joined. Due to the resulting decrease in the SSC, the enterprise network may force the device to be re-evaluated before allowing it to re-join the network. For example, such techniques may be useful when employees travel with their laptops. In addition, users or system administrators may leverage the SSC of the network to authorize which device resources a network may be allowed to access. For example, the device's firewall may prevent networks not meeting certain security levels from being permitted to access file shares or web servers running on the device.

Figure 39:
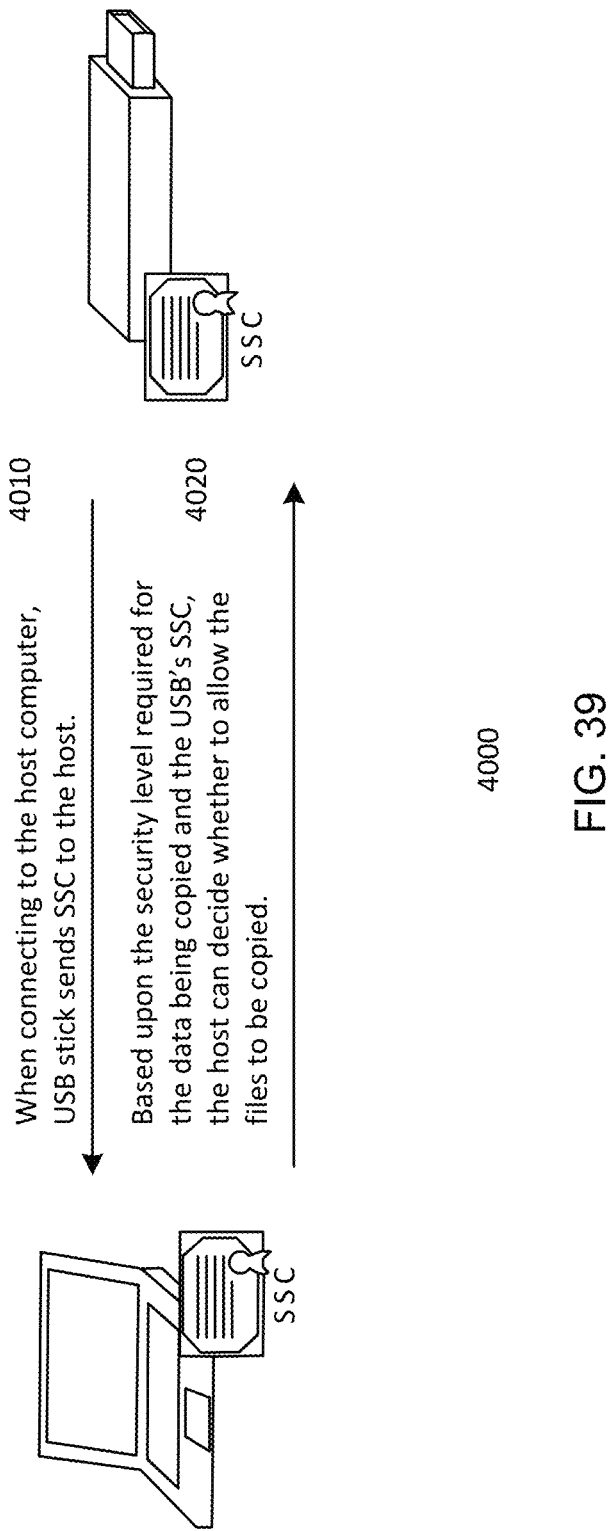
FIG. 39 is peripheral verification according to an embodiment of the invention.

FIG. 39 is a security verification 4000 according to an embodiment of the invention. Besides authenticating and authorizing networks, a computer may authenticate and authorize devices based upon their SSC. For example, a USB storage device may contain an SSC and send the SSC to the computer when connecting to the computer 4010. If the SSC does not meet certain criteria (e.g. does not adequately encrypt data at rest), the host computer may prevent a user from copying information to the USB stick 4020. Furthermore, if the host computer can detect the nature of the data being copied, the decision 4020 on whether or not to allow the copy to occur may be based on a combination of the data itself and the SSC of the destination device. Similar examples could exist for many other types of devices. In some embodiments, the handshaking between devices may be modified in order to ensure the SSCs are always transmitted. For example, as part of the USB handshaking protocol, both the host and slave devices may share their SSC. This may allow the devices to perform mutual authentication and authorization.

Devices may also utilize the SSC for allowing access to sensitive information on the device itself. For example, a device with a trusted computing space may be configured to only grant access to encrypted information on the device if the SSC meets certain criteria. The trusted computing processor may detect an attempt to access an encrypted volume and then determine whether the current SSC meets the criteria for that encrypted volume. Even if the user knows the decryption keys, the device may prevent them from decrypting the information because the device (which may have been compromised) is no longer trusted. This may enable specially designed computing devices that leverage separate components for sensitive storage, which may require an SSC to comply with a SRC. Essentially, the sensitive storage component may be seen by the system as a separate device.

Hardware and software products may utilize a user provided SRC and desired SSC (within an available range) to automatically configure parameters and settings to establish SOSs to ensure compliance. Removing the burden from the user to determine what combination of parameters available in the product configuration may provide functionality and security. Likewise, resource owners may require certain services or devices to be disabled or stopped while accessing their resources. Leveraging both the auto configuration and QSM auto evaluation processes may allow for this type of dynamic configuration to match security requirements.

SSC may provide product purchasing information. A product manufacturer may provide the SSC for a product online, allowing for consumers to perform a direct comparison between products in their particular security environment. Similarly, web sites could allow potential consumers to submit an SRC in order to learn what products meet their security requirements. This may allow consumers to judge which product produces the desired security enhancement or performance prior to making the purchase. It may even be possible to develop systems to run simulations of systems in order to learn how implementing new products or configurations may impact overall security. Manufacturers may be able to quantify the amount of security they can provide to a user, and show how much security they will add over their competitors for a given security SRC.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A system for secure electronic access comprising;
    a device under protection including at least one security processor configured to receive at least one electronic certificate from an electronic device seeking to access a secure resource on the device under protection, the at least one certificate providing device information generated by an evaluation of the security of the electronic device; and
    an autonomous system including at least one autonomous processor and at least one autonomous memory, the at least one autonomous memory storing security requirement information, the at least one autonomous processor configured to compare the device information to the security requirement information, the at least one autonomous processor configured to instruct the at least one security processor to provide the secure resource to the device in response to determining the device information meets the security requirement information, wherein the device under protection provides the secure resource to the electronic device in response to the instruction.

2. The system of claim 1 wherein the secure resource includes a digital file or a collection of digital files.

3. The system of claim 2 wherein the at least one autonomous processor is configured to create a compressed archive containing the digital file or collection of digital files and a security requirement certificate including the security requirement information and a set of permission key-value pairs and validates the at least one electronic certificate of the security system.

4. The system of claim 3 wherein the at least one autonomous processor is configured to apply an encrypted digital signature, providing an indicia of authenticity and an indicia of the author to the digital file or each of the digital files in the collection of digital files, the digital signature being applied upon file creation and updated or applied as a second encrypted digital signature each time the digital file or the collection of digital files changes.

5. The system of claim 2 wherein the at least one autonomous processor is configured to enforce attributes, settings, and permissions to control printing, copying, display, editing, and/or transmitting of the digital file or the collection of digital files based on the security requirement information.

6. The system of claim 1 wherein the secure resource includes a hardware resource.

7. The system of claim 1 wherein the at least one autonomous processor is configured to control conditions of use of the secure resource by the electronic device based on the comparison.

8. The system of claim 1 wherein:
the autonomous system includes an autonomous system private key disposed in the autonomous system,
the autonomous system is configured to sign a message with the autonomous system private key and send the autonomous system signed message to a source, and
the source is configured to determine whether there has been unauthorized access to or tampering with the autonomous system.

9. The system of claim 8 wherein:
the source includes a source private key disposed within the source,
the source is configured to sign a message with the source private key and send the source signed message to the autonomous system, and
the autonomous system is configured to determine whether there has been unauthorized access to or tampering with the source.

10. A system for secure electronic access comprising:
a device under protection including at least one security processor configured to receive at least one electronic certificate describing the security of the device under protection, the device under protection being configured to output:
the at least one electronic certificate,
a resource in a form unusable to the device under protection, and
security requirement information;
an autonomous system including at least one autonomous processor and at least one autonomous memory storing the at least one electronic certificate, the at least one autonomous processor being configured to provide the at least one electronic certificate to the device under protection; and
an authorizer system constructed and arranged to perform at least one authorizer process by:
receiving the at least one electronic certificate, the resource in a form unusable to the device under protection, and the security requirement information from the device under protection,
comparing the at least one electronic certificate to the security requirement information,
transforming the resource to a form useable to the device under protection in response to determining the at least one electronic certificate indicates that the security system meets the security requirement information, and
providing to the device under protection the resource in the form useable to the device under protection.

11. The system of claim 10 wherein the resource includes a digital file or a collection of digital files.

12. The system of claim 11 wherein the digital file or the collection of digital files in the form useable by the device under protection is stored in the at least one autonomous memory.

13. The system of claim 11 wherein the at least one autonomous processor is configured to enforce attributes, settings, and permissions to control printing, copying, displaying, editing, and/or transmitting of the digital file or the collection of digital files based on the security requirement information.

14. The system of claim 10 wherein the at least one autonomous processor is configured to control condition of use of the resource by the security system based on the comparison.

15. The system of claim 10 wherein the at least one autonomous processor is configured to control conditions of use of the resource by the device under protection based on information from the autonomous system.

16. The system of claim 10 wherein:
the autonomous system includes an autonomous system private key disposed in the autonomous system,
the autonomous system is configured to sign a message with the autonomous system private key and send the autonomous system signed message to a source, and
the source is configured to determine whether there has been unauthorized access to or tampering with the autonomous system.

17. The system of claim 16 wherein:
the source includes a source private key disposed within the source,
the source is configured to sign a message with the source private key and send the source signed message to the autonomous system, and
the autonomous system is configured to determine whether there has been unauthorized access to or tampering with the source.

18. A method for securing electronic access comprising:
receiving at least one electronic certificate from an electronic device seeking to access a secure resource at a device under protection including at least one security processor, the at least one certificate providing device information generated by an evaluation of the security of the electronic device;
comparing, with at least one autonomous processor of an autonomous system, the device information to the security requirement information;

instructing, with the at least one autonomous processor, the at least one security processor to provide the secure resource to the device in response to determining the device information meets the security requirement information; and providing, with the device under protection, the secure resource to the electronic device in response to the instruction.

19. The method of claim 18 wherein the secure resource includes a digital file or a collection of digital files.

20. The method of claim 19 further comprising:

creating, with the at least one autonomous processor, a compressed archive containing the digital file or the collection of digital files and the security requirement information and a set of permission key-value pairs, and validating, with the at least one autonomous processor, that the device information meets the security requirement information.

21. The method of claim 20 further comprising applying, with the at least one autonomous processor, an encrypted digital signature, providing an indicia of authenticity and an indicia of authorship to the digital file or each of the digital files in the collection of digital files, the digital signature being applied upon file creation and updated or applied as a second encrypted digital signature each time the digital file or the collection of digital files change.

22. The method of claim 19 further comprising enforcing, with the at least one autonomous processor, attributes, settings, and permissions to control printing, copying, displaying, editing, and/or transmitting of the digital file or collection of the digital files based on the security requirement information.

23. The method of claim 18 wherein the secure resource includes a hardware resource.

24. The method of claim 18 further comprising controlling, with the at least one autonomous processor, conditions of use of the secure resource by the device based on the comparing.

25. The method of claim 18 further comprising signing, with the autonomous system, a message with an autonomous system private key and sending the autonomous system signed message to a source, the source determining whether there has been unauthorized access to or tampering with the control system.

26. The method of claim 25 further comprising signing, with the source, a message with a source private key and sending the source signed message to the autonomous system, the autonomous system determining whether there has been unauthorized access to or tampering with the source.

27. A method for secure electronic access comprising:

storing at least one electronic certificate describing security of a device under protection in at least one autonomous memory of an autonomous system;

providing, with at least one autonomous processor of the autonomous system, the at least one certificate to the device under protection;

outputting with the autonomous system, the at least one electronic certificate, a resource in a form unusable to the device under protection, and security requirement information to an authorizer system;

comparing, by at least one authorizer process of the authorizer system, the at least one certificate to the security requirement information;

transforming, by the at least one authorizer process, the resource to a form usable to the device under protection in response to determining the at least one electronic certificate indicates that the device under protection meets the security requirement information; and providing, by the at least one authorizer process, to the device under protection the resource in the form usable to the autonomous system.

28. The method of claim 27 wherein the resource includes a digital file or a collection of digital files.

29. The method of claim 28 further comprising storing the resource in the form usable to the electronic system in the at least one autonomous memory.

30. The method of claim 28 further comprising enforcing, with the autonomous system, attributes, settings, and permission to control printing, copying, displaying, editing, and/or transmitting of the digital file or the collection of digital files based on the security requirement information.

31. The method of claim 27 wherein the at least one autonomous process controls conditions of use of the resource by the device under protection based on the comparing.

32. The method of claim 27 further comprising controlling, with the at least one autonomous processor, conditions of use of the resource by the device under protection based on information from the authorizer system.

33. The method of claim 27 further comprising signing, with the autonomous system, a message with an autonomous system private key and sending the autonomous system signed message to a source, the source determining whether there has been unauthorized access to or tampering with the autonomous system.

34. The method of claim 33 further comprising signing, with the source, a message with a source private key and sending the source signed message to the autonomous system, the autonomous determining whether there has been unauthorized access to or tampering with the source.

* * * * *